(12) United States Patent
Kang et al.

(10) Patent No.: US 9,461,771 B2
(45) Date of Patent: Oct. 4, 2016

(54) METHOD AND APPARATUS FOR TRANSMITTING AND RECEIVING DOWNLINK CONTROL INFORMATION

(71) Applicant: KT CORPORATION, Gyeonggi-do (KR)

(72) Inventors: Seung Hyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/664,854

(22) Filed: Mar. 21, 2015

(65) Prior Publication Data

US 2015/0271794 A1 Sep. 24, 2015

(30) Foreign Application Priority Data

| Mar. 21, 2014 | (KR) | 10-2014-0033589 |
| Mar. 25, 2014 | (KR) | 10-2014-0034957 |
| Mar. 31, 2014 | (KR) | 10-2014-0037398 |
| May 19, 2014 | (KR) | 10-2014-0059630 |
| Dec. 8, 2014 | (KR) | 10-2014-0175182 |

(51) Int. Cl.
*H04W 4/00* (2009.01)
*H04L 1/00* (2006.01)
*H04L 27/00* (2006.01)
*H04L 27/36* (2006.01)

(52) U.S. Cl.
CPC .......... *H04L 1/0003* (2013.01); *H04L 1/0001* (2013.01); *H04L 1/0023* (2013.01); *H04L 27/0008* (2013.01); *H04L 27/0012* (2013.01); *H04L 27/362* (2013.01)

(58) Field of Classification Search
CPC ... H04L 27/00; H04L 1/0003; H04L 1/0023; H04L 1/0001
See application file for complete search history.

(56) References Cited

FOREIGN PATENT DOCUMENTS

WO 2014/029108 A1 2/2014

OTHER PUBLICATIONS

Huawei et al., "CQI/MCS table design for 256QAM", R1-140034, 3GPP TSG RAN WG1 Meeting #76, Prague, Czech Republic, Feb. 10-14, 2014.
ZTE, "On standard impacts of 256QAM in downlink", R1-140258, 3GPP TSG RAN WG1 Meeting #76, Prague, Czech Republic, Feb. 10-14, 2014.
HTC, "Higher Order Modulation for Small Cell Enhancement", R1-140224, 3GPP TSG RAN WG1 Meeting #76, Prague, Czech Republic, Feb. 10-14, 2014.
QUALCOMM Incorporated, "Higher order modulation", R1-140451, 3GPP TSG RAN WG1 Meeting #76, Prague, Czech Republic, Feb. 10-14, 2014.

*Primary Examiner* — Afshawn Towfighi
(74) *Attorney, Agent, or Firm* — IP Legal Services, LLC

(57) ABSTRACT

The present disclosure relates to a method and an apparatus for transmitting and receiving DCI for supporting 256QAM. Particularly, the method for receiving DCI by a user equipment, may include: transmitting, to a base station, channel state information including information obtained by measuring a channel quality state; receiving, from the base station, the DCI including an MCS index value selected based on the channel state information in a predetermined MCS index table including an MCS index value corresponding to a 256QAM modulation method; and identifying modulation information on downlink data on the basis of the selected MCS index value.

18 Claims, 42 Drawing Sheets

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG.1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG.3
*PRIOR ART*

| CQI INDEX | MODULATION | CODE RATE X 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG.4
PRIOR ART

| CQI INDEX | $I_{MCS}$ | $I_{TBS}$ | CODE RATE * 1024 | EFFICIENCY |
|---|---|---|---|---|
| 2 | 0 | 0 | 120 | 0.2344 |
| - | 1 | 1 | 157 | 0.3057 |
| 3 | 2 | 2 | 193 | 0.3770 |
| - | 3 | 3 | 251 | 0.4893 |
| 4 | 4 | 4 | 308 | 0.6016 |
| - | 5 | 5 | 379 | 0.7393 |
| 5 | 6 | 6 | 449 | 0.8770 |
| - | 7 | 7 | 526 | 1.0264 |
| 6 | 8 | 8 | 602 | 1.1758 |
| - | 9 | 9 | 679 | 1.3262 |
| - | 10 | 9 | 340 | 1.3262 |
| 7 | 11 | 10 | 378 | 1.4766 |
| - | 12 | 11 | 434 | 1.6954 |
| 8 | 13 | 12 | 490 | 1.9141 |
| - | 14 | 13 | 553 | 2.1602 |
| 9 | 15 | 14 | 616 | 2.4063 |
| - | 16 | 15 | 658 | 2.5684 |
| - | 17 | 15 | 438 | 2.5684 |
| 10 | 18 | 16 | 466 | 2.7305 |
| - | 19 | 17 | 517 | 3.0264 |
| 11 | 20 | 18 | 567 | 3.3223 |
| - | 21 | 19 | 616 | 3.6123 |
| 12 | 22 | 20 | 666 | 3.9023 |
| - | 23 | 21 | 719 | 4.2129 |
| 13 | 24 | 22 | 772 | 4.5234 |
| - | 25 | 23 | 822 | 4.8193 |
| 14 | 26 | 24 | 873 | 5.1152 |
| - | 27 | 25 | 910 | 5.3350 |
| 15 | 28 | 26 | 948 | 5.5547 |

FIG.7

| CQI INDEX | $I_{MCS}$ | $I_{TBS}$ | CODE RATE *1024 | EFFICIENCY | Esti. Req. SNR | Eff. CODE RATE*1024 | Eff. EFFICIENCY | Eval. Req. SNR | Esti. Req. SNR - Eval. Req. SNR |
|---|---|---|---|---|---|---|---|---|---|
| 10 | 18 | 16 | 466 | 2.730 | 7.210 | 466.004 | 2.73049 | 7.199 | 0.010 |
| | 19 | 17 | 517 | 3.029 | 8.163 | 516.845 | 3.02839 | 8.131 | 0.032 |
| 11 | 20 | 18 | 567 | 3.322 | 9.098 | 566.960 | 3.32203 | 9.071 | 0.027 |
| | 21 | 19 | 616 | 3.609 | 10.015 | 616.783 | 3.61396 | 10.024 | -0.009 |
| 12 | 22 | 20 | 666 | 3.902 | 10.950 | 665.742 | 3.90083 | 10.990 | -0.041 |
| | 23 | 21 | 719 | 4.213 | 11.941 | 719.048 | 4.21317 | 11.972 | -0.031 |
| 13 | 24 | 22 | 772 | 4.523 | 12.932 | 771.961 | 4.52321 | 12.820 | 0.112 |
| | 25 | 23 | 822 | 4.816 | 13.867 | 821.769 | 4.81505 | 13.783 | 0.084 |
| 14 | 26 | 24 | 873 | 5.115 | 14.820 | 872.917 | 5.11475 | 14.772 | 0.048 |
| | 27 | 25 | 910 | 5.332 | 15.618 | 911.160 | 5.33883 | 15.637 | -0.018 |
| 15 | 28 | 26 | 948 | 5.555 | 16.606 | 948.043 | 5.55494 | 16.607 | -0.001 |

FIG.8

| CODE RATE *1024 | EFFICIENCY | Esti. Req. SNR | Eff. CODE RATE*1024 | Eff. EFFICIENCY | Eval. Req. SNR | Esti. Req. SNR - Eval. Req. SNR |
|---|---|---|---|---|---|---|
| 654 | 5.109 | 15.490 | 653.907 | 5.109 | 15.511 | -0.021 |
| 683 | 5.336 | 16.108 | 682.666 | 5.333 | 16.023 | 0.085 |
| 708 | 5.531 | 16.640 | 707.764 | 5.529 | 16.587 | 0.053 |
| 711 | 5.555 | 16.704 | 711.032 | 5.555 | 16.646 | 0.058 |
| 724 | 5.656 | 16.981 | 723.730 | 5.654 | 16.979 | 0.002 |
| 740 | 5.781 | 17.322 | 739.720 | 5.779 | 17.313 | 0.009 |
| 756 | 5.906 | 17.663 | 755.690 | 5.904 | 17.639 | 0.024 |
| 773 | 6.039 | 18.025 | 773.140 | 6.040 | 18.007 | 0.017 |
| 789 | 6.164 | 18.366 | 788.983 | 6.164 | 18.328 | 0.037 |
| 805 | 6.289 | 18.706 | 804.648 | 6.286 | 18.693 | 0.013 |
| 821 | 6.414 | 19.047 | 820.947 | 6.414 | 19.030 | 0.017 |
| 838 | 6.547 | 19.409 | 837.920 | 6.546 | 19.390 | 0.019 |
| 854 | 6.672 | 19.750 | 853.711 | 6.670 | 19.686 | 0.064 |
| 870 | 6.797 | 20.091 | 870.111 | 6.798 | 20.059 | 0.032 |
| 886 | 6.922 | 20.483 | 886.131 | 6.923 | 20.526 | -0.043 |
| 903 | 7.055 | 20.940 | 902.752 | 7.053 | 20.933 | 0.007 |
| 919 | 7.180 | 21.386 | 918.912 | 7.179 | 21.388 | -0.002 |
| 935 | 7.305 | 21.850 | 934.524 | 7.301 | 21.862 | -0.013 |
| 952 | 7.438 | 22.360 | 951.852 | 7.436 | 22.362 | -0.002 |

FIG.9

| THE NUMBER OF MCS INDICES FOR HARQ RETRANSMISSION | THE NUMBER OF MCS INDICES | THE NUMBER OF TRANSMISSION EFFICIENCIES FOR EACH OF WHICH MCS INDICES OVERLAP | THE NUMBER OF TRANSMISSION EFFICIENCIES | THE NUMBER OF TRANSMISSION EFFICIENCIES DEFINED BETWEEN ADJACENT CQIS |
|---|---|---|---|---|
| 3 | 29 | 0 | 29 | 1 OR 2 |
| 3 | 29 | 2 | 27 | 1 |
| 3 | 29 | 3 | 26 | 0 OR 1 |
| 4 | 28 | 0 | 28 | 1 OR 2 |
| 4 | 28 | 2 | 26 | 0 OR 1 |
| 4 | 28 | 3 | 25 | 0 OR 1 |

FIG.11

| CQI INDEX | MCS INDEX | MODULATION | R | EFFICIENCY | TARGET SNR | Esti. Req. SNR | SNR GAP | $I_{TBS}$ |
|---|---|---|---|---|---|---|---|---|
| 10 | 18 | 64QAM | 466 | 2.7305 | 7.2095 | 7.2095 | - | 16 |
|  | 19 | 64QAM | 546 | 3.1992 | 8.7124 | 8.7055 | 1.4960 | 27 |
| 11 | 20 | 64QAM | 627 | 3.6738 | 10.2152 | 10.2202 | 1.5147 | 28 |
|  | 21 | 64QAM | 707 | 4.1426 | 11.7181 | 11.7162 | 1.4960 | 29 |
| 12 | 22 | 64QAM | 787 | 4.6113 | 13.2210 | 13.2122 | 1.4960 | 30 |
|  | 23 | 64QAM | 868 | 5.0859 | 14.7238 | 14.7269 | 1.5147 | 31 |
| 13 | 24 | 64QAM | 934 | 5.4727 | 16.2267 | 16.2279 | 1.5010 | 32 |
|  | 25 | 256QAM | 759 | 5.9297 | 17.7296 | 17.7266 | 1.4987 | 33 |
| 14 | 26 | 256QAM | 830 | 6.4844 | 19.2324 | 19.2389 | 1.5123 | 34 |
|  | 27 | 256QAM | 895 | 6.9922 | 20.7353 | 20.7223 | 1.4834 | 35 |
| 15 | 28 | 256QAM | 948 | 7.4063 | 22.2382 | 22.2382 | 1.5159 | 36 |

FIG.12

| CQI INDEX | MCS INDEX | MODULATION | R | EFFICIENCY | TARGET SNR | Esti. Req. SNR | SNR GAP | $I_{TBS}$ |
|---|---|---|---|---|---|---|---|---|
| 10 | 18 | 64QAM | 466 | 2.7305 | 7.2095 | 7.2095 | - | 16 |
|  | 19 | 64QAM | 547 | 3.2051 | 8.7245 | 8.7242 | 1.5147 | 27 |
| 11 | 20 | 64QAM | 628 | 3.6797 | 10.2396 | 10.2389 | 1.5147 | 28 |
|  | 21 | 64QAM | 709 | 4.1543 | 11.7546 | 11.7536 | 1.5147 | 29 |
| 12 | 22 | 64QAM | 790 | 4.6289 | 13.2697 | 13.2683 | 1.5147 | 30 |
|  | 23 | 64QAM | 871 | 5.1035 | 14.7847 | 14.7830 | 1.5147 | 31 |
| 13 | 24 | 64QAM | 937 | 5.4902 | 16.2997 | 16.3075 | 1.5245 | 32 |
|  | 25 | 256QAM | 763 | 5.9609 | 17.8148 | 17.8118 | 1.5043 | 33 |
| 14 | 26 | 256QAM | 834 | 6.5156 | 19.3298 | 19.3241 | 1.5123 | 34 |
|  | 27 | 256QAM | 900 | 7.0313 | 20.8448 | 20.8576 | 1.5335 | 35 |
| 15 | 28 | 256QAM | 952 | 7.4375 | 22.3599 | 22.3599 | 1.5023 | 36 |

FIG.13

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 547 | 3.2051 | 8.7242 | 1.5147 | 27 |
| 11 | 20 | 64QAM | 627 | 3.6738 | 10.2202 | 1.4960 | 28 |
|  | 21 | 64QAM | 707 | 4.1426 | 11.7162 | 1.4960 | 29 |
| 12 | 22 | 64QAM | 787 | 4.6113 | 13.2122 | 1.4960 | 30 |
|  | 23 | 64QAM | 861 | 5.0449 | 14.5960 | 1.3838 | 31 |
| 13 | 24 | 64QAM | 934 | 5.4727 | 16.2279 | 1.6319 | 32 |
|  | 25 | 256QAM | 766 | 5.9844 | 17.8757 | 1.6478 | 33 |
| 14 | 26 | 256QAM | 830 | 6.4844 | 19.2389 | 1.3632 | 34 |
|  | 27 | 256QAM | 889 | 6.9453 | 20.5620 | 1.3231 | 35 |
| 15 | 28 | 256QAM | 948 | 7.4063 | 22.2382 | 1.6762 | 36 |

FIG.14

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 547 | 3.2051 | 8.7242 | 1.5147 | 27 |
| 11 | 20 | 64QAM | 628 | 3.6797 | 10.2389 | 1.5147 | 28 |
|  | 21 | 64QAM | 709 | 4.1543 | 11.7536 | 1.5147 | 29 |
| 12 | 22 | 64QAM | 790 | 4.6289 | 13.2683 | 1.5147 | 30 |
|  | 23 | 64QAM | 864 | 5.0625 | 14.6521 | 1.3838 | 31 |
| 13 | 24 | 64QAM | 937 | 5.4902 | 16.3075 | 1.6554 | 32 |
|  | 25 | 256QAM | 769 | 6.0078 | 17.9396 | 1.6321 | 33 |
| 14 | 26 | 256QAM | 834 | 6.5156 | 19.3241 | 1.3845 | 34 |
|  | 27 | 256QAM | 893 | 6.9766 | 20.6686 | 1.3445 | 35 |
| 15 | 28 | 256QAM | 952 | 7.4375 | 22.3599 | 1.6913 | 36 |

FIG.15

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 541 | 3.1699 | 8.6120 | 1.4025 | 27 |
| 11 | 20 | 64QAM | 616 | 3.6094 | 10.0145 | 1.4025 | 19 |
|  | 21 | 64QAM | 694 | 4.0664 | 11.4731 | 1.4586 | 28 |
| 12 | 22 | 64QAM | 772 | 4.5234 | 12.9317 | 1.4586 | 22 |
|  | 23 | 64QAM | 844 | 4.9453 | 14.2781 | 1.3464 | 29 |
| 13 | 24 | 64QAM | 910 | 5.3320 | 15.6185 | 1.3404 | 25 |
|  | 25 | 256QAM | 738 | 5.7656 | 17.2793 | 1.6608 | 30 |
| 14 | 26 | 256QAM | 815 | 6.3672 | 18.9194 | 1.6401 | 31 |
|  | 27 | 256QAM | 890 | 6.9531 | 20.5885 | 1.6691 | 32 |
| 15 | 28 | 256QAM | 948 | 7.4063 | 22.2382 | 1.6497 | 33 |

FIG.16

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 541 | 3.1699 | 8.6120 | 1.4025 | 27 |
| 11 | 20 | 64QAM | 616 | 3.6094 | 10.0145 | 1.4025 | 19 |
|  | 21 | 64QAM | 694 | 4.0664 | 11.4731 | 1.4586 | 28 |
| 12 | 22 | 64QAM | 772 | 4.5234 | 12.9317 | 1.4586 | 22 |
|  | 23 | 64QAM | 844 | 4.9453 | 14.2781 | 1.3464 | 29 |
| 13 | 24 | 64QAM | 910 | 5.3320 | 15.6185 | 1.3404 | 25 |
|  | 25 | 256QAM | 739 | 5.7734 | 17.3006 | 1.6821 | 30 |
| 14 | 26 | 256QAM | 818 | 6.3906 | 18.9833 | 1.6827 | 31 |
|  | 27 | 256QAM | 893 | 6.9766 | 20.6686 | 1.6853 | 32 |
| 15 | 28 | 256QAM | 952 | 7.4375 | 22.3599 | 1.6913 | 33 |

FIG.17

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 541 | 3.1699 | 8.6120 | 1.4025 | 27 |
| 11 | 20 | 64QAM | 616 | 3.6094 | 10.0145 | 1.4025 | 19 |
|  | 21 | 64QAM | 694 | 4.0664 | 11.4731 | 1.4586 | 28 |
| 12 | 22 | 64QAM | 772 | 4.5234 | 12.9317 | 1.4586 | 22 |
|  | 23 | 64QAM | 841 | 4.9277 | 14.2220 | 1.2903 | 29 |
| 13 | 24 | 64QAM | 910 | 5.3320 | 15.6185 | 1.3965 | 25 |
|  | 25 | 256QAM | 749 | 5.8516 | 17.5136 | 1.8951 | 30 |
| 14 | 26 | 256QAM | 815 | 6.3672 | 18.9194 | 1.4058 | 31 |
|  | 27 | 256QAM | 882 | 6.8906 | 20.3779 | 1.4585 | 32 |
| 15 | 28 | 256QAM | 948 | 7.4063 | 22.2382 | 1.8603 | 33 |

FIG.18

| CQI INDEX | MCS INDEX | MODULATION | R | EFFICIENCY | Esti. Req. SNR | SNR GAP | $I_{TBS}$ |
|---|---|---|---|---|---|---|---|
| 10 | 18 | 64QAM | 466 | 2.7305 | 7.2095 | - | 16 |
|  | 19 | 64QAM | 541 | 3.1699 | 8.6120 | 1.4025 | 27 |
| 11 | 20 | 64QAM | 616 | 3.6094 | 10.0145 | 1.4025 | 19 |
|  | 21 | 64QAM | 694 | 4.0664 | 11.4731 | 1.4586 | 28 |
| 12 | 22 | 64QAM | 772 | 4.5234 | 12.9317 | 1.4586 | 22 |
|  | 23 | 64QAM | 841 | 4.9277 | 14.2220 | 1.2903 | 29 |
| 13 | 24 | 64QAM | 910 | 5.3320 | 15.6185 | 1.3965 | 25 |
|  | 25 | 256QAM | 750 | 5.8594 | 17.5349 | 1.9164 | 30 |
| 14 | 26 | 256QAM | 818 | 6.3906 | 18.9833 | 1.4484 | 31 |
|  | 27 | 256QAM | 885 | 6.9141 | 20.4564 | 1.4731 | 32 |
| 15 | 28 | 256QAM | 952 | 7.4375 | 22.3599 | 1.9035 | 33 |

FIG.19
PRIOR ART

| $I_{TBS}$ | $N_{PRB}$ | | | | | | | | | | |
|---|---|---|---|---|---|---|---|---|---|---|---|
| | 1 | 2 | 3 | 4 | 5 | 6 | 7 | 8 | 9 | 10 | 11 |
| 0 | 16 | 32 | 56 | 88 | 120 | 152 | 176 | 208 | 224 | 256 | 288 |
| 1 | 24 | 56 | 88 | 144 | 176 | 208 | 224 | 256 | 328 | 344 | 376 |
| 2 | 32 | 72 | 144 | 176 | 208 | 256 | 296 | 328 | 376 | 424 | 472 |
| 3 | 40 | 104 | 176 | 208 | 256 | 328 | 392 | 440 | 504 | 568 | 616 |
| 4 | 56 | 120 | 208 | 256 | 328 | 408 | 488 | 552 | 632 | 696 | 776 |
| 5 | 72 | 144 | 224 | 328 | 424 | 504 | 600 | 680 | 776 | 872 | 968 |
| 6 | 328 | 176 | 256 | 392 | 504 | 600 | 712 | 808 | 936 | 1032 | 1128 |
| 7 | 104 | 224 | 328 | 472 | 584 | 712 | 840 | 968 | 1096 | 1224 | 1320 |
| 8 | 120 | 256 | 392 | 536 | 680 | 808 | 968 | 1096 | 1256 | 1384 | 1544 |
| 9 | 136 | 296 | 456 | 616 | 776 | 936 | 1096 | 1256 | 1416 | 1544 | 1736 |
| 10 | 144 | 328 | 504 | 680 | 872 | 1032 | 1224 | 1384 | 1544 | 1736 | 1928 |
| 11 | 176 | 376 | 584 | 776 | 1000 | 1192 | 1384 | 1608 | 1800 | 2024 | 2216 |
| 12 | 208 | 440 | 680 | 904 | 1128 | 1352 | 1608 | 1800 | 2024 | 2280 | 2472 |
| 13 | 224 | 488 | 744 | 1000 | 1256 | 1544 | 1800 | 2024 | 2280 | 2536 | 2856 |
| 14 | 256 | 552 | 840 | 1128 | 1416 | 1736 | 1992 | 2280 | 2600 | 2856 | 3112 |
| 15 | 280 | 600 | 904 | 1224 | 1544 | 1800 | 2152 | 2472 | 2728 | 3112 | 3368 |
| 16 | 328 | 632 | 968 | 1288 | 1608 | 1928 | 2280 | 2600 | 2984 | 3240 | 3624 |

FIG.20

| $I_{TBS}$ | VoIP TBS | | | | | |
|---|---|---|---|---|---|---|
| | 144 | 176 | 208 | 224 | 256 | 328 |
| 0 | × | ○ | ○ | ○ | ○ | ○ |
| 1 | ○ | ○ | ○ | ○ | ○ | ○ |
| 2 | ○ | ○ | ○ | × | ○ | ○ |
| 3 | × | ○ | ○ | × | ○ | ○ |
| 4 | × | × | ○ | × | ○ | ○ |
| 5 | ○ | ○ | × | ○ | ○ | ○ |
| 6 | × | ○ | × | × | × | ○ |
| 7 | × | × | × | ○ | ○ | ○ |
| 8 | × | × | × | × | × | × |
| 9 | × | × | × | × | × | × |
| 10 | ○ | ○ | ○ | ○ | × | ○ |
| 11 | × | × | ○ | × | × | × |
| 12 | × | × | × | ○ | × | × |
| 13 | × | × | × | × | ○ | × |
| 14 | × | × | × | × | × | × |
| 15 | × | × | × | × | × | × |
| 16 | × | × | × | × | × | ○ |

FIG.21

| $I_{MCS}$ | CODE RATE * 1024 | MODULATION | $I_{TBS}$ | EXISTING CQI INDEX | EXISTING $I_{MCS}$ | SNR GAP |
|---|---|---|---|---|---|---|
| 0 | 120 | QPSK | 0 | 2 | 0 | - |
| 1 | 157 | QPSK | 1 | - | 1 | 1.1071 |
| 2 | 193 | QPSK | 2 | 3 | 2 | 0.8627 |
| 3 | 308 | QPSK | 4 | 4 | 4 | 1.9639 |
| 4 | 449 | QPSK | 6 | 5 | 6 | 1.9189 |
| 5 | 602 | QPSK | 8 | 6 | 8 | 1.8643 |
| 6 | 378 | 16QAM | 10 | 7 | 11 | 1.9623 |
| 7 | 434 | 16QAM | 11 | - | 12 | 0.9296 |
| 8 | 490 | 16QAM | 12 | 8 | 13 | 0.8781 |
| 9 | 553 | 16QAM | 13 | - | 14 | 0.976 |
| 10 | 616 | 16QAM | 14 | 9 | 15 | 0.9802 |
| 11 | 658 | 16QAM | 15 | - | 16 | 0.676 |
| 12 | 466 | 64QAM | 16 | 10 | 18 | 1.2208 |
| 13 | 517 | 64QAM | 17 | - | 19 | 0.9314 |
| 14 | 567 | 64QAM | 18 | 11 | 20 | 0.9401 |
| 15 | 616 | 64QAM | 19 | - | 21 | 0.9525 |
| 16 | 666 | 64QAM | 20 | 12 | 22 | 0.9666 |
| 17 | 719 | 64QAM | 21 | - | 23 | 0.9815 |
| 18 | 772 | 64QAM | 22 | 13 | 24 | 0.8481 |
| 19 | 822 | 64QAM | 23 | - | 25 | 0.9632 |
| 20 | 873 | 64QAM | 24 | 14 | 26 | 0.9893 |
| 21 | 910 | 64QAM | 25 | - | 27 | 0.8644 |
| 22 | $R_{22}$ | 256QAM | 27 | - | - | - |
| 23 | $R_{23}$ | 256QAM | 28 | - | - | - |
| 24 | $R_{24}$ | 256QAM | 29 | - | - | - |
| 25 | $R_{25}$ | 256QAM | 30 | - | - | - |
| 26 | $R_{26}$ | 256QAM | 31 | - | - | - |
| 27 | $R_{27}$ | 256QAM | 32 | - | - | - |
| 28 | $R_{28}$ | 256QAM | 33 | - | - | - |
| 29 | | RESERVED | | | | |
| 30 | | | | | | |
| 31 | | | | | | |

FIG.22

| R=CODE RATE * 1024 | MODULATION | TARGET SNR |
|---|---|---|
| $R_{22}$ | 256QAM | 16.6748 |
| $R_{24}$ | 256QAM | 18.5293 |
| $R_{26}$ | 256QAM | 20.3837 |
| 948 | 256QAM | 22.2382 |

FIG.23

| $I_{MCS}$ | R | MODULATION | TARGET Req. SNR | Est. Req. SNR |
|---|---|---|---|---|
| 22 | 710 | 256QAM | 16.6748 | 16.6829 |
| 23 | $R_{23}$ | 256QAM | - | - |
| 24 | 797 | 256QAM | 18.5293 | 18.5360 |
| 25 | $R_{25}$ | 256QAM | - | - |
| 26 | 882 | 256QAM | 20.3837 | 20.3779 |
| 27 | $R_{27}$ | 256QAM | - | - |
| 28 | 948 | 256QAM | 22.2382 | 22.2382 |

FIG.24

| $I_{MCS}$ | R | MODULATION | Esti. Req. SNR | SNR GAP | $I_{TBS}$ |
|---|---|---|---|---|---|
| 22 | 710 | 256QAM | 16.6829 | - | 27 |
| 23 | 753 | 256QAM | 17.5988 | 0.9159 | 28 |
| 24 | 797 | 256QAM | 18.5360 | 0.9372 | 29 |
| 25 | 840 | 256QAM | 19.4519 | 0.9159 | 30 |
| 26 | 882 | 256QAM | 20.3779 | 0.9260 | 31 |
| 27 | 916 | 256QAM | 21.3014 | 0.9236 | 32 |
| 28 | 948 | 256QAM | 22.2382 | 0.9368 | 33 |

FIG.25

| R=CODE RATE * 1024 | MODULATION | TARGET SNR |
|---|---|---|
| $R_{22}$ | 256QAM | 16.7053 |
| $R_{24}$ | 256QAM | 18.5901 |
| $R_{26}$ | 256QAM | 20.4750 |
| 952 | 256QAM | 22.3599 |

FIG.26

| $I_{MCS}$ | R | MODULATION | TARGET Req. SNR | Est. Req. SNR |
|---|---|---|---|---|
| 22 | 711 | 256QAM | 16.7053 | 16.7042 |
| 23 | $R_{23}$ | 256QAM | - | - |
| 24 | 800 | 256QAM | 18.5901 | 18.5999 |
| 25 | $R_{25}$ | 256QAM | - | - |
| 26 | 886 | 256QAM | 20.4750 | 20.4827 |
| 27 | $R_{27}$ | 256QAM | - | - |
| 28 | 952 | 256QAM | 22.3599 | 22.3599 |

FIG.27

| $I_{MCS}$ | R | MODULATION | Esti. Req. SNR | SNR GAP | $I_{TBS}$ |
|---|---|---|---|---|---|
| 22 | 711 | 256QAM | 16.7042 | - | 27 |
| 23 | 755 | 256QAM | 17.6414 | 0.9372 | 28 |
| 24 | 800 | 256QAM | 18.5999 | 0.9585 | 29 |
| 25 | 844 | 256QAM | 19.5371 | 0.9372 | 30 |
| 26 | 886 | 256QAM | 20.4827 | 0.9456 | 31 |
| 27 | 920 | 256QAM | 21.4149 | 0.9323 | 32 |
| 28 | 952 | 256QAM | 22.3599 | 0.9449 | 33 |

FIG.28

| $I_{MCS}$ | R | MODULATION | Esti. Req. SNR | SNR GAP | $I_{TBS}$ |
|---|---|---|---|---|---|
| 22 | 710 | 256QAM | 16.6829 | - | 27 |
| 23 | 754 | 256QAM | 17.6201 | 0.9372 | 28 |
| 24 | 797 | 256QAM | 18.5360 | 0.9159 | 29 |
| 25 | 840 | 256QAM | 19.4519 | 0.9159 | 30 |
| 26 | 882 | 256QAM | 20.3779 | 0.9260 | 31 |
| 27 | 915 | 256QAM | 21.2732 | 0.8954 | 32 |
| 28 | 948 | 256QAM | 22.2382 | 0.9650 | 33 |

FIG.29

| $I_{MCS}$ | R | MODULATION | ESTI. REQ. SNR | SNR GAP | $I_{TBS}$ |
|---|---|---|---|---|---|
| 22 | 711 | 256QAM | 16.7042 | - | 27 |
| 23 | 756 | 256QAM | 17.6627 | 0.9585 | 28 |
| 24 | 800 | 256QAM | 18.5999 | 0.9372 | 29 |
| 25 | 843 | 256QAM | 19.5158 | 0.9159 | 30 |
| 26 | 886 | 256QAM | 20.4827 | 0.9669 | 31 |
| 27 | 919 | 256QAM | 21.3865 | 0.9038 | 32 |
| 28 | 952 | 256QAM | 22.3599 | 0.9734 | 33 |

FIG.30

| $I_{MCS}$ | CODE RATE * 1024 | MODULATION | $I_{TBS}$ | EXISTING CQI Index | EXISTING $I_{MCS}$ | MCS SNR |
|---|---|---|---|---|---|---|
| 0 | 120 | QPSK | 0 | 2 | 0 | - |
| 1 | 193 | QPSK | 2 | 3 | 2 | 1.9698 |
| 2 | 308 | QPSK | 4 | 4 | 4 | 1.9639 |
| 3 | 449 | QPSK | 6 | 5 | 6 | 1.9189 |
| 4 | 602 | QPSK | 8 | 6 | 8 | 1.8643 |
| 5 | 378 | 16QAM | 10 | 7 | 11 | 1.9623 |
| 6 | 434 | 16QAM | 11 | - | 12 | 0.9296 |
| 7 | 490 | 16QAM | 12 | 8 | 13 | 0.8781 |
| 8 | 553 | 16QAM | 13 | - | 14 | 0.976 |
| 9 | 616 | 16QAM | 14 | 9 | 15 | 0.9802 |
| 10 | 658 | 16QAM | 15 | - | 16 | 0.676 |
| 11 | 466 | 64QAM | 16 | 10 | 18 | 1.2208 |
| 12 | 517 | 64QAM | 17 | - | 19 | 0.9314 |
| 13 | 567 | 64QAM | 18 | 11 | 20 | 0.9401 |
| 14 | 616 | 64QAM | 19 | - | 21 | 0.9525 |
| 15 | 666 | 64QAM | 20 | 12 | 22 | 0.9666 |
| 16 | 719 | 64QAM | 21 | - | 23 | 0.9815 |
| 17 | 772 | 64QAM | 22 | 13 | 24 | 0.8481 |
| 18 | 822 | 64QAM | 23 | - | 25 | 0.9632 |
| 19 | 873 | 64QAM | 24 | 14 | 26 | 0.9893 |
| 20 | 910 | 64QAM | 25 | - | 27 | 0.8644 |
| 21 | $R_{21}$ | 256QAM | 27 | - | - | - |
| 22 | $R_{22}$ | 256QAM | 28 | - | - | - |
| 23 | $R_{23}$ | 256QAM | 29 | - | - | - |
| 24 | $R_{24}$ | 256QAM | 30 | - | - | - |
| 25 | $R_{25}$ | 256QAM | 31 | - | - | - |
| 26 | $R_{26}$ | 256QAM | 32 | - | - | - |
| 27 | $R_{27}$ | 256QAM | 33 | - | - | - |
| 28 | | RESERVED | | | | |
| 29 | | | | | | |
| 30 | | | | | | |
| 31 | | | | | | |

FIG.31

| $I_{MCS}$ | R | MODULATION |
|---|---|---|
| 22 | 711 | 256QAM |
| 23 | 754 | 256QAM |
| 24 | 797 | 256QAM |
| 25 | 839.5 | 256QAM |
| 26 | 882 | 256QAM |
| 27 | 915 | 256QAM |
| 28 | 948 | 256QAM |

FIG.32

| $I_{MCS}$ | EFFICIENCY | MODULATION | $I_{TBS}$ | EXISTING CQI INDEX | EXISTING $I_{MCS}$ | SNR GAP |
|---|---|---|---|---|---|---|
| 0 | 0.2344 | QPSK | 0 | 2 | 0 | - |
| 1 | 0.3057 | QPSK | 1 | - | 1 | 1.1071 |
| 2 | 0.3770 | QPSK | 2 | 3 | 2 | 0.8627 |
| 3 | 0.6016 | QPSK | 4 | 4 | 4 | 1.9639 |
| 4 | 0.8770 | QPSK | 6 | 5 | 6 | 1.9189 |
| 5 | 1.1758 | QPSK | 8 | 6 | 8 | 1.8643 |
| 6 | 1.4766 | 16QAM | 10 | 7 | 11 | 1.9623 |
| 7 | 1.6953 | 16QAM | 11 | - | 12 | 0.9296 |
| 8 | 1.9141 | 16QAM | 12 | 8 | 13 | 0.8781 |
| 9 | 2.1602 | 16QAM | 13 | - | 14 | 0.976 |
| 10 | 2.4063 | 16QAM | 14 | 9 | 15 | 0.9802 |
| 11 | 2.5684 | 16QAM | 15 | - | 16 | 0.676 |
| 12 | 2.7305 | 64QAM | 16 | 10 | 18 | 1.2208 |
| 13 | 3.0264 | 64QAM | 17 | - | 19 | 0.9314 |
| 14 | 3.3223 | 64QAM | 18 | 11 | 20 | 0.9401 |
| 15 | 3.6123 | 64QAM | 19 | - | 21 | 0.9525 |
| 16 | 3.9023 | 64QAM | 20 | 12 | 22 | 0.9666 |
| 17 | 4.2129 | 64QAM | 21 | - | 23 | 0.9815 |
| 18 | 4.5234 | 64QAM | 22 | 13 | 24 | 0.8481 |
| 19 | 4.8193 | 64QAM | 23 | - | 25 | 0.9632 |
| 20 | 5.1152 | 64QAM | 24 | 14 | 26 | 0.9893 |
| 21 | 5.3350 | 64QAM | 25 | - | 27 | 0.8644 |
| 22 | 5.5547 | 256QAM | 27 | - | - | - |
| 23 | 5.8906 | 256QAM | 28 | - | - | - |
| 24 | 6.2266 | 256QAM | 29 | - | - | - |
| 25 | 6.5586 | 256QAM | 30 | - | - | - |
| 26 | 6.8906 | 256QAM | 31 | - | - | - |
| 27 | 7.1484 | 256QAM | 32 | - | - | - |
| 28 | 7.4063 | 256QAM | 33 | - | - | - |
| 29 | RESERVED | | | | | |
| 30 | | | | | | |
| 31 | | | | | | |

FIG. 33

| $I_{MCS}$ | EFFICIENCY | MODULATION | $I_{TBS}$ | EXISTING CQI INDEX | EXISTING $I_{MCS}$ | MCS SNR |
|---|---|---|---|---|---|---|
| 0 | 0.2344 | QPSK | 0 | | 0 | - |
| 1 | 0.3770 | QPSK | 2 | 2 | 2 | 1.9698 |
| 2 | 0.6016 | QPSK | 4 | 3 | 4 | 1.9639 |
| 3 | 0.8770 | QPSK | 6 | 4 | 6 | 1.9189 |
| 4 | 1.1758 | QPSK | 8 | 5 | 8 | 1.8643 |
| 5 | 1.4766 | 16QAM | 10 | 6 | 11 | 1.9623 |
| 6 | 1.6953 | 16QAM | 11 | 7 | 12 | 0.9296 |
| 7 | 1.9141 | 16QAM | 12 | - | 13 | 0.8781 |
| 8 | 2.1602 | 16QAM | 13 | 8 | 14 | 0.976 |
| 9 | 2.4063 | 16QAM | 14 | - | 15 | 0.9802 |
| 10 | 2.5684 | 16QAM | 15 | 9 | 16 | 0.676 |
| 11 | 2.7305 | 64QAM | 16 | - | 18 | 1.2208 |
| 12 | 3.0264 | 64QAM | 17 | 10 | 19 | 0.9314 |
| 13 | 3.3223 | 64QAM | 18 | - | 20 | 0.9401 |
| 14 | 3.6123 | 64QAM | 19 | 11 | 21 | 0.9525 |
| 15 | 3.9023 | 64QAM | 20 | - | 22 | 0.9666 |
| 16 | 4.2129 | 64QAM | 21 | 12 | 23 | 0.9815 |
| 17 | 4.5234 | 64QAM | 22 | - | 24 | 0.8481 |
| 18 | 4.8193 | 64QAM | 23 | 13 | 25 | 0.9632 |
| 19 | 5.1152 | 64QAM | 24 | - | 26 | 0.9893 |
| 20 | 5.3350 | 64QAM | 25 | 14 | 27 | 0.8644 |
| 21 | 5.5547 | 256QAM | 27 | - | - | - |
| 22 | 5.8906 | 256QAM | 28 | - | - | - |
| 23 | 6.2266 | 256QAM | 29 | - | - | - |
| 24 | 6.5586 | 256QAM | 30 | - | - | - |
| 25 | 6.8906 | 256QAM | 31 | - | - | - |
| 26 | 7.1484 | 256QAM | 32 | - | - | - |
| 27 | 7.4063 | 256QAM | 33 | - | - | - |
| 28 | | Reserved | | | | |
| 29 | | | | | | |
| 30 | | | | | | |
| 31 | | | | | | |

FIG.34

| $I_{MCS}$ | R | MODULATION |
|---|---|---|
| 22 | 711 | 256QAM |
| 24 | 797 | 256QAM |
| 26 | 885 | 256QAM |
| 28 | 948 | 256QAM |

FIG.35

| $I_{MCS}$ | R | MODULATION |
|---|---|---|
| 22 | 711 | 256QAM |
| 23 | 754 | 256QAM |
| 24 | 797 | 256QAM |
| 25 | 841 | 256QAM |
| 26 | 885 | 256QAM |
| 27 | 916.5 | 256QAM |
| 28 | 948 | 256QAM |

FIG. 36

| $I_{MCS}$ | EFFICIENCY | MODULATION | $I_{TBS}$ | EXISTING CQI INDEX | EXISTING $I_{MCS}$ | SNR GAP |
|---|---|---|---|---|---|---|
| 0 | 0.2344 | QPSK | 0 | 2 | 0 | - |
| 1 | 0.3057 | QPSK | 1 | - | 1 | 1.1071 |
| 2 | 0.3770 | QPSK | 2 | 3 | 2 | 0.8627 |
| 3 | 0.6016 | QPSK | 4 | 4 | 4 | 1.9639 |
| 4 | 0.8770 | QPSK | 6 | 5 | 6 | 1.9189 |
| 5 | 1.1758 | QPSK | 8 | 6 | 8 | 1.8643 |
| 6 | 1.4766 | 16QAM | 10 | 7 | 11 | 1.9623 |
| 7 | 1.6953 | 16QAM | 11 | - | 12 | 0.9296 |
| 8 | 1.9141 | 16QAM | 12 | 8 | 13 | 0.8781 |
| 9 | 2.1602 | 16QAM | 13 | - | 14 | 0.976 |
| 10 | 2.4063 | 16QAM | 14 | 9 | 15 | 0.9802 |
| 11 | 2.5684 | 16QAM | 15 | - | 16 | 0.676 |
| 12 | 2.7305 | 64QAM | 16 | 10 | 18 | 1.2208 |
| 13 | 3.0264 | 64QAM | 17 | - | 19 | 0.9314 |
| 14 | 3.3223 | 64QAM | 18 | 11 | 20 | 0.9401 |
| 15 | 3.6123 | 64QAM | 19 | - | 21 | 0.9525 |
| 16 | 3.9023 | 64QAM | 20 | 12 | 22 | 0.9666 |
| 17 | 4.2129 | 64QAM | 21 | - | 23 | 0.9815 |
| 18 | 4.5234 | 64QAM | 22 | 13 | 24 | 0.8481 |
| 19 | 4.8193 | 64QAM | 23 | - | 25 | 0.9632 |
| 20 | 5.1152 | 64QAM | 24 | 14 | 26 | 0.9893 |
| 21 | 5.3350 | 64QAM | 25 | - | 27 | 0.8644 |
| 22 | 5.5547 | 256QAM | 27 | - | - | - |
| 23 | 5.8906 | 256QAM | 28 | - | - | - |
| 24 | 6.2266 | 256QAM | 29 | - | - | - |
| 25 | 6.5703 | 256QAM | 30 | - | - | - |
| 26 | 6.9141 | 256QAM | 31 | - | - | - |
| 27 | 7.1602 | 256QAM | 32 | - | - | - |
| 28 | 7.4063 | 256QAM | 33 | - | - | - |
| 29 | | Reserved | | | | |
| 30 | | | | | | |
| 31 | | | | | | |

FIG.37

| $I_{MCS}$ | R | MODULATION |
|---|---|---|
| 21 | 711 | 256QAM |
| 22 | 754 | 256QAM |
| 23 | 797 | 256QAM |
| 24 | 841 | 256QAM |
| 25 | 885 | 256QAM |
| 26 | 916.5 | 256QAM |
| 27 | 948 | 256QAM |

FIG. 38

| $I_{MCS}$ | EFFICIENCY | MODULATION | $I_{TBS}$ | EXISTING CQI INDEX | EXISTING $I_{MCS}$ | MCS SNR |
|---|---|---|---|---|---|---|
| 0 | 0.2344 | QPSK | 0 | 2 | 0 | - |
| 1 | 0.3770 | QPSK | 2 | 3 | 2 | 1.9698 |
| 2 | 0.6016 | QPSK | 4 | 4 | 4 | 1.9639 |
| 3 | 0.8770 | QPSK | 6 | 5 | 6 | 1.9189 |
| 4 | 1.1758 | QPSK | 8 | 6 | 8 | 1.8643 |
| 5 | 1.4766 | 16QAM | 10 | 7 | 11 | 1.9623 |
| 6 | 1.6953 | 16QAM | 11 | - | 12 | 0.9296 |
| 7 | 1.9141 | 16QAM | 12 | 8 | 13 | 0.8781 |
| 8 | 2.1602 | 16QAM | 13 | - | 14 | 0.976 |
| 9 | 2.4063 | 16QAM | 14 | 9 | 15 | 0.9802 |
| 10 | 2.5684 | 16QAM | 15 | - | 16 | 0.676 |
| 11 | 2.7305 | 64QAM | 16 | 10 | 18 | 1.2208 |
| 12 | 3.0264 | 64QAM | 17 | - | 19 | 0.9314 |
| 13 | 3.3223 | 64QAM | 18 | 11 | 20 | 0.9401 |
| 14 | 3.6123 | 64QAM | 19 | - | 21 | 0.9525 |
| 15 | 3.9023 | 64QAM | 20 | 12 | 22 | 0.9666 |
| 16 | 4.2129 | 64QAM | 21 | - | 23 | 0.9815 |
| 17 | 4.5234 | 64QAM | 22 | 13 | 24 | 0.8481 |
| 18 | 4.8193 | 64QAM | 23 | - | 25 | 0.9632 |
| 19 | 5.1152 | 64QAM | 24 | 14 | 26 | 0.9893 |
| 20 | 5.3350 | 64QAM | 25 | - | 27 | 0.8644 |
| 21 | 5.5547 | 256QAM | 27 | - | - | - |
| 22 | 5.8906 | 256QAM | 28 | - | - | - |
| 23 | 6.2266 | 256QAM | 29 | - | - | - |
| 24 | 6.5703 | 256QAM | 30 | - | - | - |
| 25 | 6.9141 | 256QAM | 31 | - | - | - |
| 26 | 7.1602 | 256QAM | 32 | - | - | - |
| 27 | 7.4063 | 256QAM | 33 | - | - | - |
| 28 | | RESERVED | | | | |
| 29 | | | | | | |
| 30 | | | | | | |
| 31 | | | | | | |

METHOD AND APPARATUS FOR TRANSMITTING AND RECEIVING DOWNLINK CONTROL INFORMATION

CROSS-REFERENCE TO RELATED APPLICATION

This application claims priority from and the benefit under 35 U.S.C. §119(a) of Korean Patent Application Nos. 10-2014-0033589, 10-2014-0034957, 10-2014-0037398, 10-2014-0059630 and 10-2014-0175182, filed on Mar. 21, 2014, Mar. 25, 2014, Mar. 31, 2014, May 19, 2014 and Dec. 8, 2014, respectively, which are hereby incorporated by reference for all purposes as if fully set forth herein.

BACKGROUND OF THE INVENTION

1. Field of the Invention

The present disclosure relates to a method and an apparatus for transmitting and receiving Downlink Control Information (DCI) in case of supporting 256-state Quadrature Amplitude Modulation (256QAM). More particularly, the present disclosure relates to a method and an apparatus for transmitting and receiving DCI including a Modulation and Coding Scheme (MCS) index for supporting 256QAM in addition to typically used three modulation methods, such as Quadrature Phase Shift Keying (QPSK), 16-state Quadrature Amplitude Modulation (16QAM) and 64-state Quadrature Amplitude Modulation (64QAM).

2. Description of the Prior Art

Information may be transmitted through a signal using signal properties such as intensities, displacements, frequencies, and phases thereof. Modulation is a process of transforming such signal properties into proper waveforms according to a channel characteristic of a transmission medium. Also, a digital signal may be used to transmit digital information by mapping the digital information to one of bit stream and a digitalized analog signal (sampled or analog-to-digital converted signal). Digital modulation is a process of transforming such digital signal (e.g., digital symbol sequences) to a proper signal according to the channel characteristics of a transmission medium. As a representative digital modulation method having good bandwidth efficiency, an M-ary QAM modulation method is used. The M-ary QAM modulation method may be expressed as $2^M$ QAM and the M-ary QAM modulation method includes QPSK (or 4QAM), 16QAM and 64QAM.

Various modulation methods are used for downlink (DL) data transmission in a wireless communication system such as Long Term Evolution (LTE) or LTE-Advanced. Such modulation methods include QPSK, 16QAM and 64QAM. By using these modulation methods, a Base Station (BS) transmits data to a User Equipment (UE), and the UE demodulates the transmitted signal and receives the data.

Recently, an amount of data transmitted and received between terminals and associated base stations has been increased abruptly due to sharp increase in the number of user terminals and in the data usage. This requires a modulation method that can rapidly process a large amount of data traffic.

Meanwhile, a BS selects one of the modulation methods based on a DL channel status, and notifies the UE of the selected modulation method by using DCI. The UE may identify the selected modulation method based on the received DCI and may receive the data through demodulation appropriate for the data modulation method.

To this end, the UE measures the DL channel state, and transmits information on the measured DL channel state to the BS. Also, the BS includes, in the DCI, predetermined parts of MCS index information respectively mapped to QPSK, 16QAM and 64QAM, and transmits the DCI including the predetermined parts of MCS index information to the UE. However, due to sharp increases in data traffic and data speed, a new modulation method has been demanded. Furthermore, it has been also demanded for a method for indicating such a new modulation method in the DCI having a limited size.

SUMMARY OF THE INVENTION

An aspect of the present disclosure made to meet the above-mentioned demands is to provide a method and an apparatus for configuring an MCS index table for 256QAM newly defined as a modulation method.

Also, another aspect of the present disclosure is to provide a method and an apparatus for transmitting DCI to a UE by using an MCS index table including indication information to 256QAM.

In order to solve the above-mentioned technical problem, in accordance with an aspect of the present disclosure, there is provided a method for receiving downlink control information by a user equipment. The method may include: transmitting, to a base station, channel state information including information obtained by measuring a channel quality state; receiving, from the base station, the downlink control information including a Modulation and Coding Scheme (MCS) index value selected based on the channel state information in a previously-formed MCS index table including an MCS index value corresponding to a 256-state Quadrature Amplitude Modulation (256QAM) modulation method; and identifying modulation information on downlink data on the basis of the selected MCS index value.

Also, in accordance with another aspect of the present disclosure, there is provided a method for transmitting downlink control information by a base station. The method may include: receiving, from a user equipment, channel state information including information obtained by measuring a channel quality state; selecting a Modulation and Coding Scheme (MCS) index value on the basis of the channel state information in a previously-formed MCS index table including an MCS index value corresponding to a 256-state Quadrature Amplitude Modulation (256QAM) modulation method; and transmitting the downlink control information including the selected MCS index value.

Also, in accordance with still another aspect of the present disclosure, there is provided a user equipment for receiving downlink control information. The user equipment may include: a transmitter, a receiver, and a controller. The transmitter may be configured to transmit, to a base station, channel state information including information obtained by measuring a channel quality state. The receiver may be configured to receive, from the base station, the downlink control information including a Modulation and Coding Scheme (MCS) index value selected based on the channel state information in a previously-formed MCS index table including an MCS index value corresponding to a 256-state Quadrature Amplitude Modulation (256QAM) modulation method. The controller may be configured to identify modulation information on downlink data on the basis of the selected MCS index value.

Also, in accordance with yet another aspect of the present disclosure, there is provided a base station for transmitting downlink control information. The base station may include a receiver, a transmitter, and a controller. The receiver may be configured to receive, from a user equipment, channel state information including information obtained by measuring a channel quality state. The controller may be configured to select a Modulation and Coding Scheme (MCS) index value on the basis of the channel state information in a previously-formed MCS index table including an MCS index value corresponding to a 256-state Quadrature Amplitude Modulation (256QAM) modulation method. The transmitter may be configured to transmit the downlink control information including the selected MCS index value.

The present disclosure is advantageous in providing the method and the apparatus for configuring an MCS index table for 256QAM newly defined as a modulation method.

Also, the present disclosure is advantageous in providing the method and the apparatus for transmitting DCI to the UE by using an MCS index table including indication information to 256QAM.

BRIEF DESCRIPTION OF THE DRAWINGS

The above and other objects, features and advantages of the present disclosure will be more apparent from the following detailed description taken in conjunction with the accompanying drawings, in which:

FIG. 1 is a view illustrating a relationship of a modulation order, an MCS index and a Transport Block Size (TBS) index;

FIG. 3 is a view illustrating an existing CQI index table;

FIG. 4 is a view illustrating a mapping table of an existing CQI index table, an MCS and a TBS;

FIG. 7 is a view illustrating an example of transmission efficiency and a required SNR value for 64QAM in FIG. 6;

FIG. 8 is a view illustrating an example of transmission efficiency and a required SNR value for 256QAM in FIG. 6;

FIG. 9 is a view schematically illustrating examples of MCS index tables according to embodiments of the present disclosure;

FIG. 11 is a view illustrating an example of an MCS index table according to a first embodiment of the present disclosure;

FIG. 12 is a view illustrating another example of an MCS index table according to the first embodiment of the present disclosure;

FIG. 13 is a view illustrating an example of an MCS index table according to a second embodiment of the present disclosure;

FIG. 14 is a view illustrating another example of an MCS index table according to the second embodiment of the present disclosure;

FIG. 15 is a view illustrating an example of an MCS index table according to a third embodiment of the present disclosure;

FIG. 16 is a view illustrating another example of an MCS index table according to the third embodiment of the present disclosure;

FIG. 17 is a view illustrating an example of an MCS index table according to a fourth embodiment of the present disclosure;

FIG. 18 is a view illustrating another example of an MCS index table according to the fourth embodiment of the present disclosure;

FIG. 19 is a view illustrating an existing TBS table in which a Voice over Internet Protocol (VoIP) TBS is defined;

FIG. 20 is a view illustrating a table, in which a case where each TBS index includes a particular VoIP TBS is organized;

FIG. 21 is a view illustrating an example of an MCS index table according to a fifth embodiment of the present disclosure;

FIG. 22 is a view illustrating an example of a target SNR for defining an MCS index table according to the fifth embodiment of the present disclosure;

FIG. 23 is a view illustrating an example of a coding rate R according to the fifth embodiment of the present disclosure;

FIG. 24 is a view illustrating another example of a coding rate according to the fifth embodiment of the present disclosure;

FIG. 25 is a view illustrating another example of a target SNR for defining an MCS index table according to the fifth embodiment of the present disclosure;

FIG. 26 is a view illustrating still another example of a coding rate R according to the fifth embodiment of the present disclosure;

FIG. 27 is a view illustrating yet another example of a coding rate according to the fifth embodiment of the present disclosure;

FIG. 28 is a view illustrating an example of a coding rate according to a sixth embodiment of the present disclosure;

FIG. 29 is a view illustrating another example of a coding rate according to the sixth embodiment of the present disclosure;

FIG. 30 is a view illustrating an example of an MCS index table according to a seventh embodiment of the present disclosure;

FIG. 31 is a view illustrating an example of a coding rate according to a tenth embodiment of the present disclosure;

FIG. 32 is a view illustrating an example of an MCS index table according to the tenth embodiment of the present disclosure;

FIG. 33 is a view illustrating another example of an MCS index table according to the tenth embodiment of the present disclosure;

FIG. 34 is a view illustrating an example of a coding rate according to an eleventh embodiment of the present disclosure;

FIG. 35 is a view illustrating another example of a coding rate according to the eleventh embodiment of the present disclosure;

FIG. 36 is a view illustrating an example of an MCS index table according to the eleventh embodiment of the present disclosure;

FIG. 37 is a view illustrating still another example of a coding rate according to the eleventh embodiment of the present disclosure;

FIG. 38 is a view illustrating another example of an MCS index table according to the eleventh embodiment of the present disclosure;

DETAILED DESCRIPTION OF THE EXEMPLARY EMBODIMENTS

Figure 2:
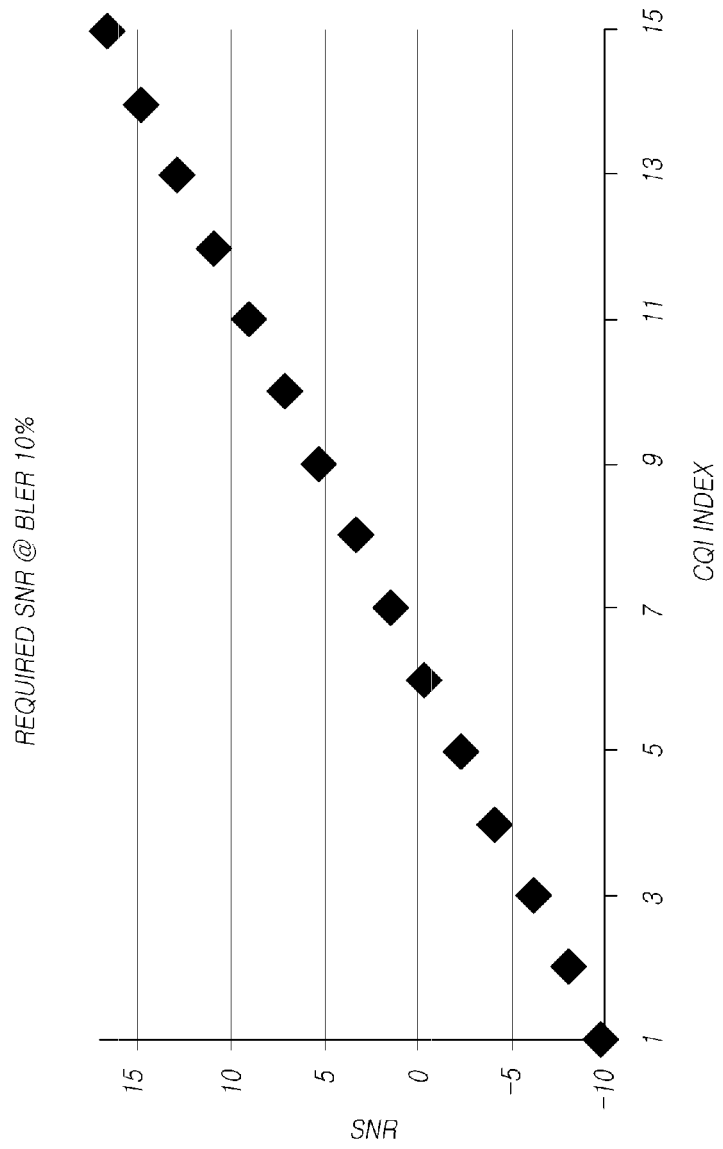
FIG. 2 is a view illustrating a Channel Quality Indicator (CQI) Block Error Rate (BLER) performance.

Hereinafter, embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a User equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in global system for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a Base Station Controller (BBC) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, and may be configured as a data channel, such as a Physical Downlink Shared Channel (PDSCH), a Physical Uplink Shared Channel (PUSCH), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Hereinafter, higher layer signaling includes an RRC signaling that transmits RRC information including an RRC parameter.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Modulation refers to transforming signal information, such as intensity, displacement, frequency, phase, or the like of a signal into predetermined waveform to be appropriate for the channel characteristics of a transmission medium. In addition, digital modulation refers to transforming a digital signal (e.g., a digital symbol sequences) for transmitting digital information in correspondence with one of various available signals (a signal set), into a signal appropriate for a channel characteristics. As a representative digital modulation scheme which has high bandwidth efficiency, a M-ary QAM modulation scheme expressed by 2M QAM, such as, QPSK (or 4QAM), 16QAM, and 64QAM, are used. Here, M denotes a modulation order, which indicates the number of digital symbols that are modulated for each time, and the modulation orders of QPSK, 16QAM, 64QAM, and 256QAM are 2, 4, 6, and 8, respectively.

A modulation scheme used for downlink data transmission in 3GPP LTE includes QPSK, 16QAM, and 64QAM. A base station selects one of the above described modulation schemes based on a downlink channel state, and informs a terminal of the same using Downlink Control Information (DCI).

FIG. 1 is a table illustrating relationship of a modulation order, an MCS index and a TBS index.

An MCS index has 5 bits and is included in the DCI. The MCS index notifies a UE of one used for transmission among three modulation methods as illustrated in FIG. 1. Referring to FIG. 1, MCS indices #0 to #28 are used for indicating Hybrid Automatic Repeat reQuest (HARQ) initial transmission, and MCS indices #29 to #31 are used for indicating HARQ retransmission.

More specifically, MCS indices #0 to #9 are used to indicate that a QPSK modulation method is used for DL data transmission, MCS indices #10 to #16 are used to indicate that a 16QAM modulation method is used for the DL data transmission, and MCS indices #17 to #28 are used to indicate that a 64QAM modulation method is used for the DL data transmission.

Multiple MCS indices indicate the same modulation method as described above. Each MCS index denotes that data can be transmitted by using codewords of different code rates. When a channel state is good, a BS increases bandwidth efficiency by using a high MCS index. In contrast, when the channel state is poor, the BS performs robust transmission by using a low MCS index so as to be able to overcome the poor channel status. That is, an MCS may be adjusted according to a channel state. Such operation may be referred to as "link adaptation." In other words, the link adaptation refers to the operation of adjusting MCS index by compensating wireless channel characteristics that vary depending on time, in order to maximize a system processing rate.

As described, the MCS indices #0 to #28 are used to indicate HARQ initial transmission, and the MCS indices #29, #30 and #31 are used to indicate one of modulation methods (e.g., QPSK modulation, 16QAM modulation, and 64QAM modulation) used for HARQ retransmission. For example, MCS index #29 indicates that QPSK modulation has been used for HARQ retransmission, MCS index #30 indicates that 16QAM modulation has been used for HARQ retransmission, and MCS index #31 indicates that 64QAM modulation has been used for HARQ retransmission.

Referring to FIG. 1, each MCS index $I_{MCS}$ is respectively mapped to an associated transport block size (TBS) index $T_{TBS}$. Per each TBS index $I_{TBS}$, a TBS is defined to have a size of information bits that can transmit 110 physical resource block (PRB) pairs, considering that a transmission resource size from one pair of physical resource blocks (PRBs) to 110 pairs of PRBs can be allocated to the UE according to the definition of the 3GP TS 36.213 document.

FIG. 2 is a graph illustrating a CQI block error rate (BLER) performance. FIG. 3 is a typical CQI index table.

The UE needs to feed back a channel state to the BS so that the BS may perform link adaptation according to the channel state of the UE. Such feed back Information on the channel state is referred to as "Channel State Information (CSI). The CSI includes a Pre-coding Matrix Indicator (PMI), a Rank Indicator (RI), and a Channel Quality Indicator (CQI). Here, the PMI and the RI are CSI related to Multiple-Input Multiple-Output (MIMO) transmission, and the CQI indicates a modulation method, a coding rate (i.e., code rate*1024) and transmission efficiency (i.e., efficiency=modulation order*coding rate) which may be used according to the channel state of the UE as illustrated in FIG. 3. When the channel state is good, the UE feeds back a CQI index indicating high transmission efficiency to the BS. In contrast, when the channel state is not good, the UE feeds back a CQI index indicating low transmission efficiency to the BS.

The typical CQI feedback information has a size of 4 bits. The typical CQI feedback information indicates 16 transmission efficiencies. FIG. 2 illustrates a required SNR value satisfying a BLER of 10% against transmission efficiency versus a performance of a CQI of FIG. 3. In an experimental environment considering a single transmission antenna and two reception antennas in an Additive White Gaussian Noise (AWGN) channel environment. In FIG. 2, the existing CQI has a range of a required SNR at a BLER of 10% which is from about −10 dB to 17 dB, and for each CQI index, transmission efficiency is configured so that a gap between SNRs is uniformly equal to about 1.9 dB.

FIG. 4 is a mapping table including a typical CQI index table, an MCS and a TBS.

The BS identifies the CQI received from the UE, and determines the amount of resources to be allocated to the UE and an MCS to be used for transmission to the UE based on the identified CQI. At this time, the above-described MCS illustrated in FIG. 1 and the above-described CQI illustrated in FIG. 3 have a relation as illustrated in FIG. 4.

Referring to FIG. 4, MCS indices 0, 2, 4, 6, 8, 11, 13, 15, 18, 20, 22, 24, 26 and 28 may be configured to have the same transmission efficiencies as those of CQI indices #2, #3, #4, #5, #6, #7, #8, #9, #10, #11, #12, #13, #14 and #15, respectively. In addition, an MCS index positioned between two consecutive CQI indices is configured to have an intermediate transmission efficiency value between transmission efficiency values of two CQI indices transmission efficiency.

However, MCS indices 9 and 10, where a modulation order is changed from QPSK to 16QAM, are configured to have the same transmission efficiency. MCS indices 16 and 17, where a modulation order is changed from 16QAM to 64QAM, are also configured to have the same transmission efficiency. Further, such MCS indices, where modulation orders are changed, are configured to have the same TBS index. Thus, the same TBS is transmitted through a transmission resource of the same amount.

The BS identifies the channel state through the CQI received from the UE, and selects a size of a transmission resource to be allocated to the UE and an MCS to be used for the relevant transmission resource, with reference to the identified channel state. At this time, the determination of a coding rate of the MCS is identical to that of a TBS which is the size of information bits to be transmitted through the relevant transmission resource.

The present disclosure proposes a method and an apparatus for transmitting and receiving CSI that is transmitted from the UE to the BS when 256QAM is added to the typical three modulation methods, such as QPSK, 16QAM and 64QAM in order to increase transmission traffic and speed. Also, specifically, the present disclosure proposes a method and an apparatus for configuring a CQI included in the CSI.

Previously, a CQI index indicating 256QAM had not been defined. Thus, it is necessary to define a CQI index corresponding to a modulation method (i.e., 256QAM) in order to transmit data by using 256QAM. Specifically, when 64QAM and 256QAM are used for identical transmission efficiency, it is necessary to define a CQI which uses 256QAM, starting from transmission efficiency for which a BLER performance of 256QAM is identical to or is better than that of 64QAM.

Figure 5:
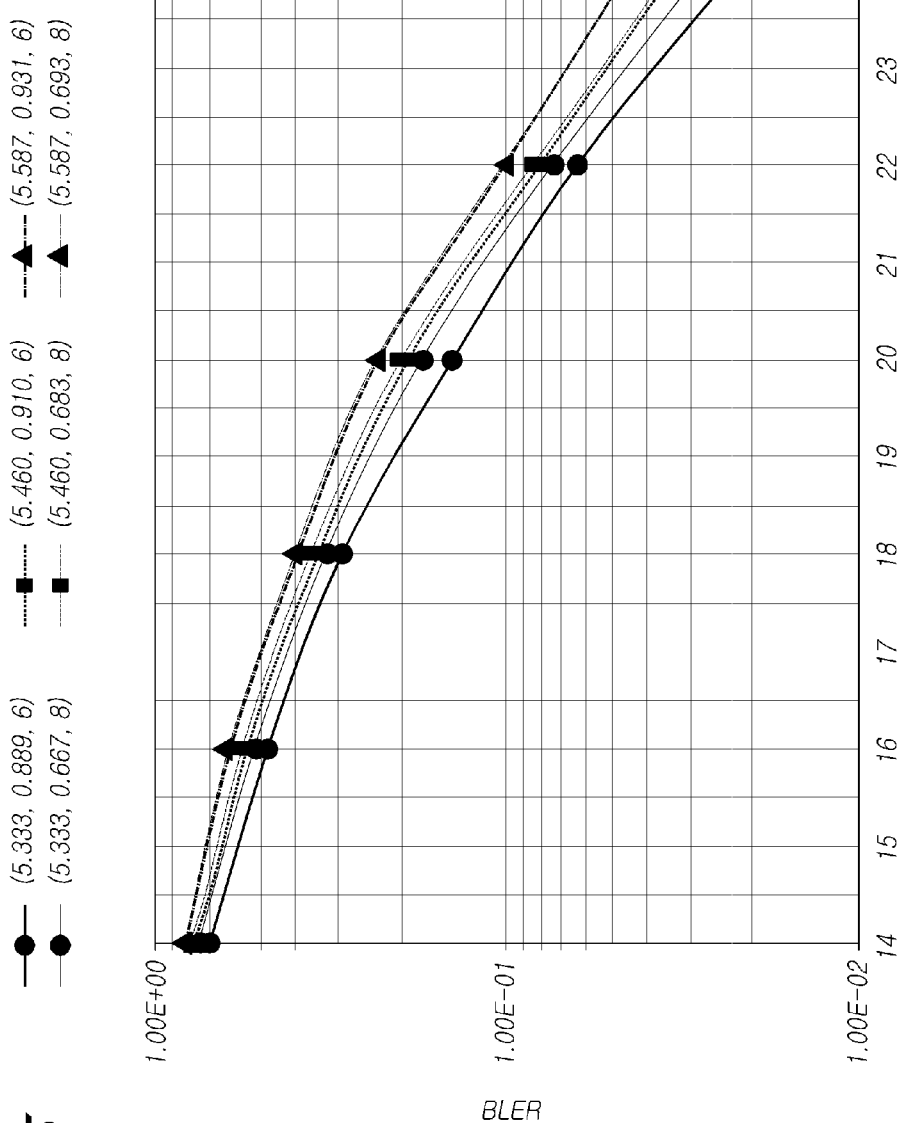
FIG. 5 is a view illustrating BLER performances of 64QAM and 256QAM at transmission efficiencies of 5.333, 5.460 and 5.587 in an Extended Pedestrian A model (EPA) 3 km/h channel model.

FIG. 5 is a graph illustrating BLER performances of 64QAM and 256QAM at transmission efficiencies of 5.333, 5.460 and 5.587 in an EPA 3 km/h channel model.

Referring to FIG. 5, a BLER performance of 64QAM is identical to that of 256QAM at transmission efficiency of 5.587. Accordingly, in the present disclosure, when it is considered that maximum transmission efficiency is equal to 5.5547 in the typical CQI index table illustrated in FIG. 3, a new CQI which indicates 256QAM as a modulation method is configured to support transmission efficiency greater than or equal to an existing transmission efficiency of 5.5547.

In order to define a new CQI supporting 256QAM while maintaining a size (e.g., 4 bits) of typical CQI feedback information, it is necessary to remove some of typical CQI indices and define new transmission efficiency.

According to an embodiment of the present disclosure, the CQI index 0 to the CQI index 10 may not be removed for defining new CQI indices because the TBS index $T_{TBS}$ 0 to the TBS index $I_{TBS}$ 16 in the typical TBS table are assigned for supporting a VoIP service. That is, in order not to affect the VoIP service, previously used CQI indices 0 to 10 may be reused and CQI indices 11 to 15 may be used to define transmission efficiencies supporting 64QAM and 256QAM.

In accordance with another embodiment, CQI indices 0 to 10 may be newly defined and even CQI indices 11 to 15 for 64QAM and 256QAM may be also newly defined.

Figure 6:
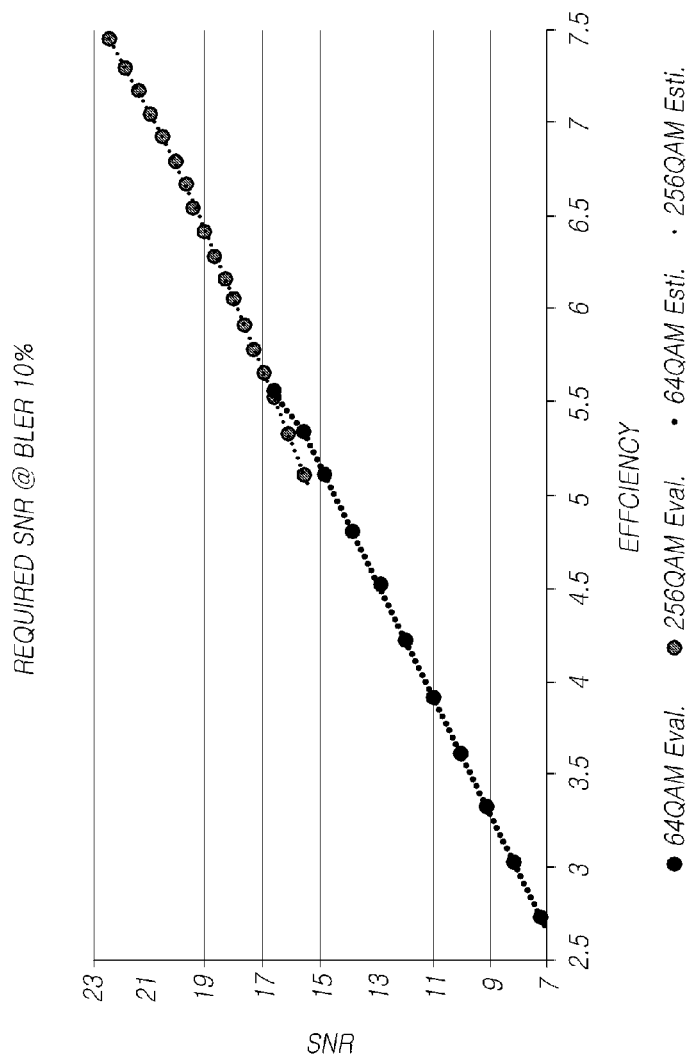
FIG. 6 is a view illustrating transmission efficiency against a required Signal-to-Noise Ratio (SNR) at a BLER of 10% for 64QAM and 256QAM.

FIG. 6 is a graph illustrating transmission efficiency a required SNR at a BLER 10% of transmission efficiency for 64QAM and 256QAM.

FIG. 7 is a table illustrating required SNR values and transmission efficiency for 64QAM in FIG. 6.

FIG. 8 is a table illustrating required SNR values and transmission efficiency for 256QAM in FIG. 6.

Referring to FIG. 7, the table of FIG. 7 illustrates required SNR values and transmission efficiency values for 64QAM as illustrated in FIG. 6. Referring to FIG. 8, the table of FIG. 8 illustrates required SNR values and transmission efficiency values for 256QAM as illustrated in FIG. 6.

According to embodiments of the present disclosure, estimated required SNRs (Esti. Req. SNR) in FIGS. 6 to 8 may be calculated i) using Equation (1) below for transmission efficiency transmission efficiency for 64QAM and ii) using Equation (2) below for transmission efficiency using 256QAM. In Equations (1) and (2) below, R denotes code rate*1024 (e.g., R=code rate*1024). Also, in this specification, R is described as a coding rate.

IF $R \leq 888$,

Estimated Required SNR=$0.0187*R-1.504$

ELSE,

Estimated Required SNR=$4.164532*10^{-5}*R^2 - 0.0514*R+27.906$ [Equation (1)]

IF $R \leq 8774$,

Estimated Required SNR=$0.0213*R+1.5599$

ELSE,

Estimated Required SNR=$3.196*10^{-5}*R^2 - 0.0303*R+22.24$ [Equation (2)]

As shown in FIG. 6, FIG. 7, and FIG. 8, required SNR values (e.g., Esti. Req. SNR) estimated by using Equations (1) and (2) are nearly identical to actually-measured SNR values (e.g., evaluated requested SNR values: Eval. Req. SNR) obtained from the experimental environment as described above. That is, a difference between the estimated request SNR and the actually-measured SNR value (e.g., Esti. Req. SNR–Eval. Req. SNR) is very small, as shown in FIG. 6, FIG. 7, and FIG. 8.

Hereinafter, a method and an apparatus for transmitting and receiving downlink control information including a new MCS index according to at least one embodiment will be described based on the above description.

As shown in FIG. 1, the MCS index table of FIG. 1 includes 32 indices. Among the 32 MCS indices, 29 MCS indices indicate transmission efficiencies and 3 MCS indices indicate a modulation method used for HARQ retransmission. Also, MCS indices 9 and 10 are configured to respectively use QPSK and 16QAM at the identical transmission efficiency. MCS indices 16 and 17 are configured to respectively use 16QAM and 64QAM at the identical transmission efficiency. As described, two MCS indices overlap for each of the two transmission efficiencies. Also, in FIG. 4, transmission efficiency defined by a CQI is necessarily included in the MCS index table. The MCS index table is configured to always support one additional transmission efficiency between adjacent CQIs. Further, MCS index 0 is configured to be identical to CQI index 2 and MCS index 28 is configured to be identical to CQI index 15.

FIG. 9 is a table illustrating elements for defining MCS index tables according to at least one embodiment of the present disclosure.

In order to support 256QAM, an MCS index table needs to be newly defined. As shown in FIG. 9, MCS index tables may be defined based on various elements. For example, three or four MCS indices may be defined for HARQ retransmission. Accordingly, one of 29 MCS indices and 28 MCS indices may be determined to be defined for HARQ initial transmission. For example, when 3 MCS indices are defined for HARQ retransmission, 29 MCS indices may be determined to be defined for HARQ initial transmission. When 4 MCS indices are defined for HARQ retransmission, 28 MCS indices may be determined to be defined for HARQ initial transmission. In addition, two MCS indices may overlap for identical transmission efficiency. In this regard, an MCS index table may be designed i) not to overlap two MCS indices at one transmission efficiency, ii) to overlap two MCS indices only for two transmission efficiencies, identical to a typical MCS index table, and iii) to overlap two MCS indices only for three transmission efficiencies by adding transmission efficiency where MCS indices using 64QAM and 256QAM overlap. transmission efficiency In order to maintain the number of transmission efficiencies defined between adjacent CQIs as 1 as being identical to the typical method, 3 MCS indices may be defined for HARQ retransmission and two transmission efficiencies are designed to be overlapped at an MCS index. In a typical TBS index table, TBS indices $I_{TBS}$ 0 to $I_{TBS}$ 16 are configured to support a VoIP service. Accordingly, MCS index 0 to MCS index 18 corresponding to $T_{TBS}$=16 are reused, and ten MCS indices 19 to 28 are defined to be associated with transmission efficiencies for supporting 64QAM and 256QAM.

Also, since the number of transmission efficiencies where MCS indices overlap is 2, MCS indices supporting 64QAM and 256QAM are defined not to overlap for identical transmission efficiency.

Figure 10:
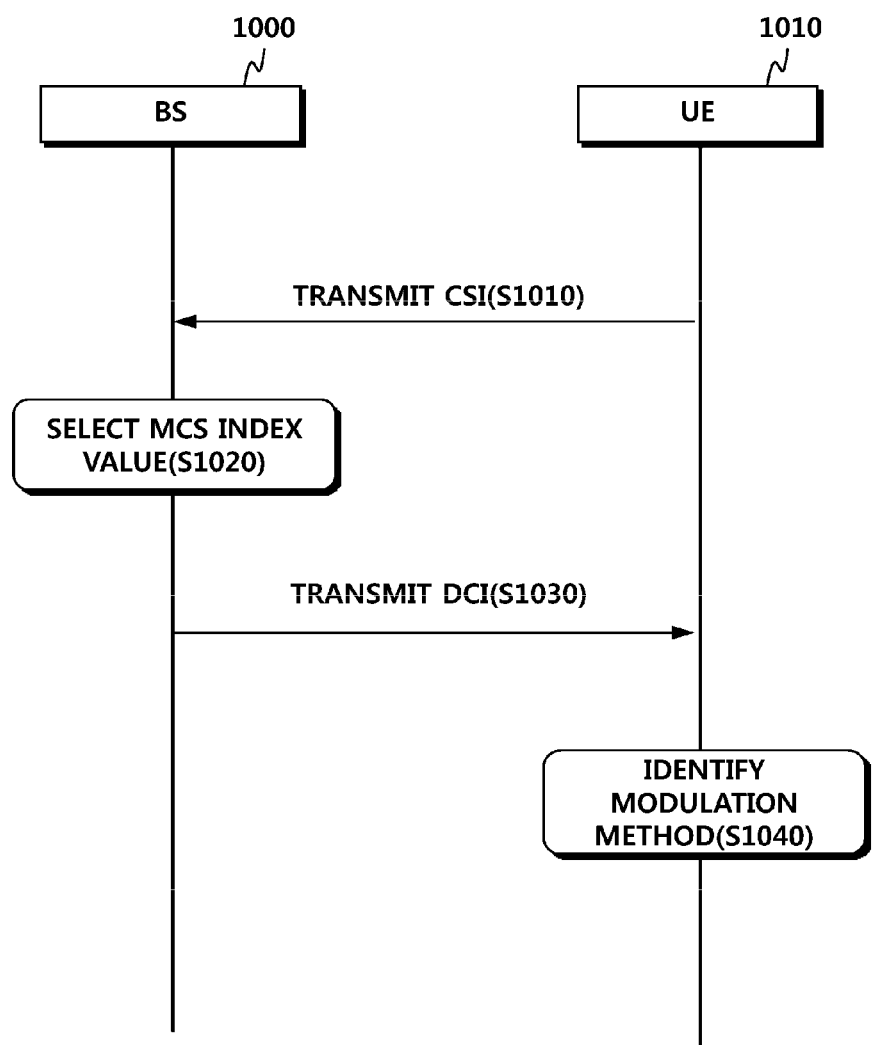
FIG. 10 is a signal flow diagram illustrating an operation of a UE and that of a BS according to an embodiment of the present disclosure.

FIG. 10 is a signal flow diagram illustrating an operation of a UE and an associated BS according to an embodiment of the present disclosure.

In accordance with at least one embodiment, a method may be provided for receiving DCI by the UE. The method may include: transmitting, to the BS, CSI including information obtained by measuring a channel quality state; receiving, from the BS, DCI including an MCS index value selected based on the CSI from a predetermined MCS index table including at least one MCS index value corresponding to a 256QAM modulation method; and identifying modulation information on DL data on the basis of the selected MCS index value.

In accordance with another embodiment, a method may be provided for transmitting DCI by the BS. The method may include: receiving, from the UE, CSI including information obtained by measuring a channel quality state; selecting an MCS index value on the basis of the CSI in a predetermined MCS index table including an MCS index value corresponding to a 256QAM modulation method; and transmitting the DCI including the selected MCS index value.

Referring to FIG. 10, the UE 1010, according to an embodiment of the present disclosure, may measure a channel quality of a DL channel. For example, the UE 1010 may measure the quality of the DL channel on the basis of a reference signal transmitted by the BS 1000, and may select a CQI corresponding to the relevant quality. In step S1010, the UE 1010 includes the selected CQI in CSI, and transmits the CSI including the selected CQI to the BS 1000.

The BS 1000 may receive the CSI from the UE 1010, and may identify a CQI index value included in the CSI. In step S1020, the BS 1000 may select an MCS index value from a predetermined MCS index table including an MCS index value corresponding to the 256QAM modulation method on the basis of the identified CQI index value. The predetermined MCS index table including the MCS index value corresponding to the 256QAM modulation method may be formed in various examples disclosed below.

In step S1030, the BS 1000 may transmit DCI including the selected MCS index value to the UE 1010. In step S1040, the UE 1010 may receive the DCI from the BS 1000, and may identify modulation information on DL data according to the selected MCS index value.

The BS 1000 may modulate the DL data according to a modulation method included in the DCI, and may transmit the modulated DL data to the UE 1010. In step S1040, the UE 1010 may recognize the modulation method for the DL data according to the identified MCS index value, and may demodulate the DL data according to the recognized modulation method.

Meanwhile, the BS 1000, according to an embodiment of the present disclosure, may select an MCS index value corresponding to a CQI index value in an MCS index table including 256QAM rather than in the existing MCS index table. Accordingly, it is necessary to newly create an MCS index table which has not previously existed. In order to efficiently process traffic and increase a transmission speed, it is very important to efficiently create an MCS index table including an MCS index value for 256QAM.

Hereinafter, a method for creating an MCS index table including an MCS index value for 256QAM that the BS refers to, will be described.

First Embodiment

In accordance with the first embodiment, transmission efficiency is defined for ten new MCS indices added from a typical MCS index 18 as a reference. As a method according to the first embodiment, transmission efficiencies may be configured so that differences between required SNRs at a BLER of 10% for MCS index 18 to all MCS indices, and required SNRs for adjacent MCS indices are maintained to be constant.

R denotes a coding rate to be used for maximum transmission efficiency in a new MCS. A maximum value of R may be defined as 948 identical to maximum transmission efficiency for a typical CQI.

In this case, a required SNR for an MCS index 18 may be used as a minimum SNR, and a required SNR calculated using in Equation (2) with R=948 may be used as a maximum SNR. Accordingly, an SNR gap (e.g., a difference) between adjacent MCS indices may be calculated according to Equation (3) below.

$$SNR_{gap} = \frac{\text{maximum} SNR - \text{minimum} SNR}{10} = \qquad [\text{Equation (3)}]$$

$$\frac{22.2382 - 7.2095}{10} = 1.5029$$

A target SNR is defined by the value of the SNR gap calculated according to Equation (3).

FIG. 11 is one example of an MCS index table created according to the first embodiment of the present disclosure.

In accordance with the first embodiment, R is determined by using Equations (1) and (2) in order to make a SNR gap between adjacent MCSs to be uniform as far as possible. A new MCS index table created in this manner is illustrated in FIG. 11.

FIG. 12 is another example of an MCS index table created according to the first embodiment of the present disclosure.

In accordance with the first embodiment, the maximum value of R to be used for the maximum transmission efficiency of a new MCS may be defined as 952 in view of the maximum code rate of 0.93 (e.g., 0.93≈952/1024) used for configuring a typical TBS. Maximum transmission efficiency R is determined by using Equations (1) and (2) to maintain a SNR gap between adjacent MCSs to be uniform. A new MCS index table, as another example, formed in this manner is illustrated in FIG. 12.

For the new MCS index as described above, ten TBS table indices need to be added for supporting transmission efficiency. Also, MCS indices 18, 20, 22, 24, 26, and 28 may be configured as CQI indices 10 to 15, respectively.

Second Embodiment

FIG. 13 illustrates an example of an MCS index table created according to a second embodiment of the present disclosure.

In accordance with the second embodiment, MCS indices 18, 20, 22, 24, 26 and 28 in the first embodiment may be configured as CQI indices 10 to 15, respectively. Accordingly, MCS indices 19, 21, 23, 25 and 27 may be configured to maintain a difference in transmission efficiency between adjacent MCS indices to be uniform. For this, an average value of two R values of adjacent CQIs is rounded off and the rounded off average value is used to configure the MCS indices 19, 21, 23, 25, and 27.

Using such a method and the CQI in FIG. 11, a new MCS index table is created in accordance with the second embodiment and such a new MCS index table is illustrated in FIG. 13.

As shown in FIG. 13, modulation methods for two adjacent CQIs are different at an MCS index 25. Accordingly, an effective R value for 256QAM is calculated from transmission efficiency for a CQI index 13, an average value of the calculated effective R value and an R value for a CQI index 14 is calculated, and the calculated average value is rounded off.

FIG. 14 illustrates another example of an MCS index table created according to the second embodiment of the present disclosure.

In a similar manner, a new MCS index table is generated by using the CQI configured in FIG. 12 in accordance with the second embodiment. Such a new MCS index table is illustrated in FIG. 14.

As shown in FIG. 14, modulation methods for two adjacent CQIs are different at an MCS index 25. Accordingly, an effective R value for 256QAM is calculated from transmission efficiency for a CQI index 13, an average value of the calculated effective R value and an R value for a CQI index 14 is calculated, and the calculated average value is rounded off.

For the new MCS index in the second embodiment, ten TBS table indices need to be added for supporting transmission efficiency.

Third Embodiment

FIG. 15 illustrates an example of an MCS index table created according to a third embodiment of the present disclosure.

In accordance with the third embodiment, transmission efficiency is first defined for five new CQIs added from a typical CQI index 10 as a reference. In the third embodiment, a typical MCS for 64QAM is reused. From typical MCS indices 18 to 28 used for 640 QAM, an MCS index is selected to maintain a difference in value of Esti. Req. SNR at a BLER of 10% between adjacent CQI indices as well as CQI index 10 (or MCS index 18) to be uniform. An MCS selected in this manner includes MCS indices 18, 21, 24 and 27 illustrated in FIG. 4. An MCS index gap between two adjacent MCS is 3 and uniform. According to the above-described method, four new MCS indices are 18, 20, 22 and 24.

Also, a new MCS may be defined by additionally assigning one transmission efficiency between adjacent CQIs. At this time, R is determined by using Equations (1) and (2) to maintain a difference in required SNR between adjacent MCS indices to be uniform. In this manner, new MCS indices are defined as being 19, 21 and 23.

Now, transmission efficiencies using 256 QAM are defined for four remaining MCS indices 25 to 28. First, as described in the first embodiment, a required SNR for a typical MCS index 27 may be used as a minimum SNR. Alternatively, a required SNR for the MCS index 24 corresponding to maximum transmission efficiency using 64QAM among the defined new MCSs may be used as a minimum SNR. A required SNR is calculated for R=948 in Equation (2). The calculated required SNR may be used as a maximum SNR. Using a similar method described in the first embodiment, transmission efficiencies using 256QAM may be defined for MCS indices 25 to 28 to maintain a difference (e.g., SNR gap) in required SNR between adjacent MCSs to be uniform.

Using such a method, transmission efficiency for a new MCS index is defined and the defined transmission efficiency is illustrated in FIG. 15.

FIG. 16 illustrates another example of an MCS index table created according to the third embodiment of the present disclosure.

Referring to FIG. 16, the MCS index table may be created using a similar method creating the MCS index table of FIG. 15. For creating the MCS index table of FIG. 16, 952 may be used as a maximum value of R to be used for maximum transmission efficiency of a new MCS in view of a maximum code rate 0.93 used to configure a typical TBS (e.g., 0.93≈952/1024).

Also, a required SNR for a typical MCS index 27 may be used as a minimum SNR. Alternatively, a required SNR of an MCS index 24 corresponding to maximum transmission efficiency using 64QAM among the defined new MCSs may be used as a minimum SNR. R is determined as 952 (R=952) and a required SNR calculated is calculated using Equation (2). The calculated required SNR may be used as a maximum SNR.

Similar to the first embodiment, transmission efficiencies using 256QAM at four MCS indices 25 to 28 may be defined to have a uniform difference in required SNR between adjacent MCSs.

Using such a method, transmission efficiency for the new MCS index may be defined in according to the third embodiment and is shown in FIG. 16.

For the new MCS index according to the third embodiment, seven TBS table indices for supporting transmission efficiency need to be added.

Fourth Embodiment

FIG. 17 illustrates an example of an MCS index table created according to a fourth embodiment of the present disclosure.

In accordance with the fourth embodiment, MCS indices 18, 20, 22, 24, 26 and 28 in the first embodiment may be configured as CQI indices 10 to 15, respectively. Accordingly, MCS indices 19, 21, 23, 25 and 27 may be configured to have a uniform difference in transmission efficiency between adjacent MCS indices. To have the uniform difference, an average value of two R values of adjacent CQIs is calculated, the calculated average value is rounded off, the rounded off average value is used to configure the MCS indices.

Using such a method, a new MCS index table is created by using the CQI configured as illustrated in FIG. 15 and such a new MCS index table illustrated in FIG. 17.

Referring to FIG. 17, in the case of MCS index 25, modulation methods for two adjacent CQIs are different. Accordingly, an effective R value for 256QAM is calculated from transmission efficiency for MCS index 24, an average value of the calculated effective R value and an R value for MCS index 26 is calculated, and the calculated average value is rounded off.

FIG. 18 illustrates another example of an MCS index table created according to the fourth embodiment of the present disclosure.

Using a similar method, a new MCS index table is formed by using the CQI configured as illustrated in FIG. 16. Such a new MCS index table is illustrated in FIG. 18.

Referring to FIG. 18, in the case of MCS index 25, modulation methods for two adjacent MCS indices are different. Accordingly, an effective R value for 256QAM is calculated from transmission efficiency for MCS index 24, an average value of the calculated effective R value and an R value for MCS index 26 is calculated, and the calculated average value is rounded off.

With respect to the new MCS index defined according to the fourth embodiment, seven TBS table indices for supporting transmission efficiency need to be added.

The MCS index tables according to the first to fourth embodiments are created not to affect a typical VoIP TBS. In this case, a difference in required SNR between adjacent MCS indices is configured to be relatively small in a low SNR range where QPSK and 16QAM are used. However, a difference in required SNR between adjacent MCS indices is configured to be relatively large in a high SNR range where 64QAM and 256QAM are used.

FIG. 19 is a TBS table where a VoIP TBS is defined. In particular, FIG. 19 illustrates a part defining a VoIP TBS of a typical TBS table.

FIG. 20 is a table illustrating TBS indices associated with a predetermined VoIP TBS. Such a table of FIG. 20 may be obtained from the table of FIG. 19. The table of FIG. 20 shows existence of each VoIP TBS (e.g., 144, 176, 208, 224, 256 and 328 bits) at each TBS index $I_{TBS}$.

Referring to FIG. 20, a TBS index including all the VoIP TBSs is $I_{TBS}=1$, and TBS indices including five VoIP TBSs are $I_{TBS}=0$ and $I_{TBS}=2$ while the total number of VoIP TBSs is six.

Fifth Embodiment

FIG. 21 illustrates an example of an MCS index table created according to a fifth embodiment of the present disclosure.

In accordance with the fifth embodiment, typical MCS indices 0, 1 and 2 are used as new MCS entries so as to reuse TBS indices $I_{TBS}=0$, 1 and 2 which all include a relatively large number of VoIP TBSs as illustrated in FIG. 20. Also, typical MCS indices 0, 2, 4, 6, 8 and 11 respectively corresponding to typical CQI index 2, 3, 4, 5, 6 and 7 are used as new MCS entries so that a difference in required SNR between adjacent MCS indices has a similar value. Further, with respect to transmission efficiencies for which 16QAM and 64QAM overlap among existing MCS indices 12 to 28, use is made of, as new MCS entries, MCS index 17 corresponding to 64QAM and remaining MCS entries except for MCS index 28, which shows the same BLER performance as 256QAM for an identical transmission efficiency as illustrated in FIG. 5, among existing MCS indices. A new MCS index table formed in this manner is illustrated in FIG. 21.

As described, 22 MCS indices among the typical 29 MCS indices are used as new MCS indices. Accordingly, transmission efficiencies need to be defined for seven MCS entries for supporting 256QAM. MCS indices 29, 30 and 31 may be used to indicate modulation methods used for HARQ retransmission.

Hereinafter, a method for defining $R_{22}$, $R_{23}$, $R_{24}$, $R_{25}$, $R_{26}$, $R_{27}$ and $R_{28}$ representing transmission efficiencies for MCS indices 22 to 28 illustrated in FIG. 21 will be described.

FIG. 22 illustrates an example of a target SNR for defining an MCS index table created according to the fifth embodiment of the present disclosure.

First, MCS indices 22 24, 26 and 28 which can be used for a CQI are defined. A required SNR for MCS index 20 illustrated in FIG. 21 may be used as a minimum SNR. A required SNR may be calculated using Equation (2) with R=948. The calculated required SNR may be used as a maximum SNR. An SNR gap is calculated through Equation (4) below using the above-described minimum SNR and maximum SNR.

$$SNR_{gap} = \frac{\text{maximum}SNR - \text{minimum}SNR}{4} = \quad \text{[Equation (4)]}$$

$$\frac{22.2382 - 14.8204}{4} = 1.8544$$

A target SNR is defined by using the value of an SNR gap calculated in the above-described method. Such a target SNR is illustrated in FIG. 22.

FIG. 23 is a table illustrating an example of a coding rate R according to the fifth embodiment of the present disclosure.

The value of R is determined by using a required SNR illustrated in FIG. 22 and Equation (2) in order to have a uniform difference in required SNR between adjacent MCS indices. The value of R is calculated to satisfy a target SNR illustrated in FIG. 22. Such a value of R is illustrated in FIG. 23.

FIG. 24 is a table illustrating another example of a coding rate according to the fifth embodiment of the present disclosure.

The value of R is determined with respect to $R_{23}$, $R_{25}$ and $R_{27}$ in FIG. 23 to have a uniform difference (e.g., equal gap) in required SNR between adjacent MCS indices and such a value R is illustrated in FIG. 24.

FIG. 25 is a table illustrating another example of a target SNR for defining an MCS index table according to the fifth embodiment of the present disclosure.

As still another embodiment of an MCS index, a maximum value of R, which is used for maximum transmission efficiency of a new MCS index, may be defined as 952 in view of a maximum code rate used for configuring a typical TBS (e.g., 0.93≈952/1024 maximum transmission efficiency. A required SNR for MCS index 20 illustrated in FIG. 21 may be used as a minimum SNR, and a required SNR calculated for R=952 in Equation (2) may be used as a maximum SNR. Target SNRs, which are defined for $R_{22}$, $R_{24}$, $R_{26}$ and $R_{28}$ corresponding to MCS indices 22, 24, 26 and 28 which can be used for a CQI, are illustrated in FIG. 25.

FIG. 26 is a table illustrating still another example of a coding rate R according to the fifth embodiment of the present disclosure.

The value of R is determined by using a required SNR illustrated in FIG. 25 and Equation (2) to have a uniform difference (e.g., equal gap) in required SNR between adjacent MCS indices. The value of R is calculated to satisfy a target SNR illustrated in FIG. 25 and the value R is illustrated in FIG. 26.

FIG. 27 is a table illustrating yet another example of a coding rate according to the fifth embodiment of the present disclosure.

In FIG. 26, the value of R is determined to have a uniform difference (e.g., equal gap) in required SNR between adjacent MCS indices with respect to $R_{23}$, $R_{25}$ and $R_{27}$. The cording rates are calculated based on the determined value R and such cording rates are illustrated in FIG. 27.

Sixth Embodiment

FIG. 28 is a table illustrating an example of a coding rate according to a sixth embodiment of the present disclosure.

In accordance with the sixth embodiment of the present disclosure, each one of $R_{23}$, $R_{25}$ and $R_{27}$ of FIG. 23 or FIG. 26 is configured to have a uniform difference (e.g., equal gap) in transmission efficiency between adjacent MCS indices. In order to have such uniform difference, an average value of R values for two adjacent MCS indices with respect to each of $R_{23}$, $R_{25}$ and $R_{27}$ is calculated, the calculated average R value is rounded off. For example, $R_{23}$ is determined by rounding off the value of $(R_{22}+R_{24})/2$. Using this method, the R values are defined based on the table of FIG. 20. The defined R values are shown in FIG. 28.

FIG. 29 is a table illustrating another example of a coding rate according to the sixth embodiment of the present disclosure.

Using the method in accordance with the sixth embodiment, R values may be defined to have a uniform difference in transmission efficiency between adjacent MCS indices based on information of FIG. 26. Such defined R values are shown in FIG. 29.

Seventh Embodiment

In accordance with the fifth embodiment and sixth embodiment, a predetermined part of the typical MCS indices are reused as shown in FIG. 21 because MCS indices 29, 30 and 31 are used to indicate the modulation methods used for HARQ retransmission.

On the other hand, an MCS index may be used to indicate modulation methods (e.g., QPSK, 16QAM, 64QAM and 256QAM) used for HARQ retransmission. That is, four MCS indices may be configured for indicating HARQ retransmission.

FIG. 30 is an MCS index table created according to a seventh embodiment of the present disclosure.

In order to have a uniform difference (e.g., SNR gap) in required SNR between adjacent MCS indices and in order to use more VoIP TBSs, a typical MCS index 1 of FIG. 21 may be removed and four MCS entries of FIG. 21 may be used for HARQ retransmission. Accordingly, in the seventh embodiment, some of the typical MCS indices may be reused as illustrated in FIG. 30. At this time, $R_{22}$, $R_{23}$, $R_{24}$, $R_{25}$, $R_{26}$, $R_{27}$ and $R_{28}$ defined in the above-described fifth and sixth embodiments are used as values of $R_{21}$, $R_{22}$, $R_{23}$, $R_{24}$, $R_{25}$, $R_{26}$ and $R_{27}$ illustrated in FIG. 30, respectively.

Eighth Embodiment

As described above, among MCS indices added for supporting 256QAM, an R value of an MCS index supporting maximum transmission efficiency is defined as 948 as shown in FIG. 11, FIG. 13, FIG. 15, FIG. 17, FIG. 24 and FIG. 28.

In contrast, according to the eighth embodiment of the present disclosure, MCS indices 22 to 27 are maintained and an R value of MCS index 28 is changed from 948 to 952 as shown in FIG. 11, FIG. 13, FIG. 15, FIG. 17, FIG. 24, and FIG. 28.

As shown in FIG. 24 and FIG. 28, an R value of an MCS index 28 was defined as 948 in accordance with the seventh embodiment. In accordance with the eighth embodiment, such an R value of the MCS index 28 is changed to 952. Accordingly, in the eighth embodiment, MCS indices 22 to 27 of FIG. 30 are maintained without change and an R value of an MCS index 27 is changed to 952 from 948.

Also, among MCS indices added for 256QAM, an R value of an MCS index supporting maximum transmission efficiency is defined as 952 in FIG. 12, FIG. 14, FIG. 16, FIG. 18, FIG. 27 and FIG. 29.

According to another method of the eighth embodiment, MCS indices 22 to 27 shown in FIG. 12, FIG. 14, FIG. 16, FIG. 18, FIG. 27 and FIG. 29 are maintained without change and a R value of an MCS index 28 may be changed from 952 to 948.

In accordance with the eighth embodiment, an R value of an MCS index 28 of FIG. 27 and FIG. 29 is changed from 952 to 948. Accordingly, MCS indices 21 to 26 of FIG. 30 according to the seventh embodiment are maintained without change, and an R value of an MCS index 27 is changed from 952 to 948 in accordance with the eighth embodiment.

Ninth Embodiment

In accordance with the ninth embodiment, an MCS index having the lowest transmission efficiency among MCS indices using 256QAM is configured to have transmission efficiency identical to a typical MCS index having the highest transmission efficiency. That is, MCS indices 23 to 28 of FIG. 24 and FIG. 28 according to the fifth and sixth embodiments are maintained without change and an R value of an MCS index 22 is changed from 710 to 711 in accordance with the ninth embodiment.

In FIG. 24 and FIG. 28, an R value of an MCS index 22 is defined as 710. In the ninth embodiment, such an R value for the MCS index 22 is defined to be changed to 711. Accordingly, MCS indices 22 to 27 shown in FIG. 30 in the seventh embodiment are maintained without change and an R value of an MCS index 21 is changed from 710 to 711 in accordance with the ninth embodiment.

Tenth Embodiment

FIG. 31 is a table illustrating an example of a coding rate according to a tenth embodiment of the present disclosure.

As shown in FIG. 23, a value of $R_{22}$ (e.g., an R value of an MCS index 22) is 710. In accordance with the tenth embodiment, such an R value is changed to 711 similar to the night embodiment. Then, R values $R_{23}$, $R_{25}$ and $R_{27}$ are calculated by averaging R values of two adjacent MCS indices. Such calculated R values are shown in FIG. 31.

FIG. 32 is an example of an MCS index table according to the tenth embodiment of the present disclosure.

In FIG. 31, an R value (e.g., $R_{25}$) of an MCS index 25 is not a natural number. Accordingly, an MCS index table is defined by transmission efficiency and a modulation method as illustrated in FIG. 32.

FIG. 33 is another example of an MCS index table according to the tenth embodiment of the present disclosure.

As still another example, a new MCS index table may be defined as shown in FIG. 33 when four MCS entries are used for HARQ retransmission as illustrated in FIG. 30 in the seventh embodiment.

Eleventh Embodiment

FIG. 34 illustrates an example of a coding rate according to an eleventh embodiment of the present disclosure. Also, FIG. 35 illustrates another example of a coding rate according to the eleventh embodiment of the present disclosure.

When coding rates and transmission efficiency used as a CQI are as illustrated in FIG. 34, $R_{23}$, $R_{25}$ and $R_{27}$ may be calculated by averaging R values for two adjacent MCS indices. Such calculated R values are illustrated in FIG. 35.

FIG. 36 is an example of an MCS index table according to the eleventh embodiment of the present disclosure.

In FIG. 35, an R value of an MCS index 27 (e.g., $R_{27}$) is not a natural number. Accordingly, an MCS index table is defined by transmission efficiency and a modulation method. Such an MCS index table is shown in FIG. 36.

FIG. 37 is a still another example of a coding rate according to the eleventh embodiment of the present disclosure.

When four MCS entries are used for HARQ retransmission as illustrated in FIG. 30 in the seventh embodiment, a coding rate for an MCS index of FIG. 35 is defined as illustrated in FIG. 37. That is, R values $R_{22}$ to $R_{28}$ of FIG. 30 are determined as R values $R_{21}$ to $R_{27}$ as illustrated in FIG. 37.

FIG. 38 is another example of an MCS index table according to the eleventh embodiment of the present disclosure.

Four MCS entries are used for HARQ retransmission as illustrated in FIG. 30 in accordance with the seventh embodiment. In this case, a new MCS index table using a coding rate of FIG. 37 is defined and the new MCS index table is illustrated in FIG. 38.

As described, the BS may select an MCS index value by using the MCS index tables newly formed according to the first to eleventh embodiments. Hereinafter, with reference to FIG. 39 and FIG. 40, operations of the UE and the BS using the MCS index tables created according to the eleventh embodiment will be described. However, the present invention is not limited thereto. The UE and the BS may perform the same operation but using the MCS index table created according to the first to tenth embodiments. In these methods, a method of configuring an MCS index table may be slightly different.

Figure 39:
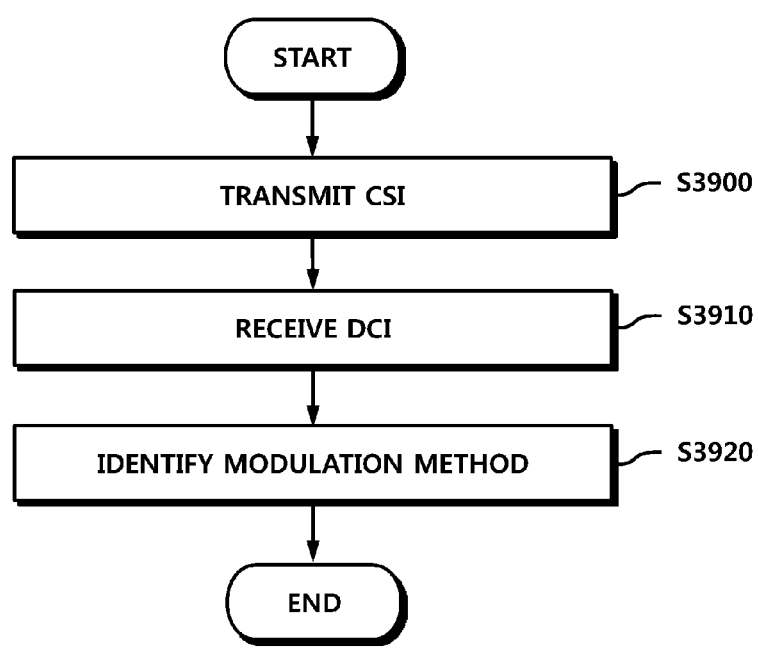
FIG. 39 is a flowchart illustrating an operation of a UE according to another embodiment of the present disclosure.

FIG. 39 is a flowchart illustrating an operation of a UE in accordance with at least one embodiment.

Referring to FIG. 39, the UE may perform a method for receiving DCI. Such a method may include: transmitting, to the BS, CSI including information obtained by measuring a channel quality state; receiving, from the BS, the DCI including an MCS index value selected based on the CSI in a predetermined MCS index table including an MCS index value corresponding to a 256QAM modulation method; and identifying modulation information on DL data on the basis of the selected MCS index value.

Referring to FIG. 39, in step S3900, the UE may transmit, to the BS, CSI including information obtained by measuring a channel quality state. The CSI may include information on a result of measuring, by the UE, a channel quality of a DL channel on the basis of a reference signal. For example, the UE receives the reference signal for channel measurement from the BS, and measures the channel quality of the DL channel by analyzing the received reference signal. Then, the UE selects a preset CQI index value according to the result of the channel quality, and includes the selected preset CQI index value in the CSI and transmits, to the BS, the CSI including the selected CQI index value.

In step S3910, the UE receives, from the BS, DCI including an MCS index value selected based on the CSI in a previously-formed MCS index table including an MCS index value corresponding to the 256QAM modulation method. The UE receives the DCI from the BS. The DCI received by the UE includes an MCS index value indicating a modulation method, and the MCS index value is a value that the BS has selected based on the CQI index value from the UE. The MCS index value is a value selected in an MCS index table pre-stored in each of the UE and the BS, and includes information on a modulation method for DL data. Specifically, as described above, the MCS index value may include information on a modulation order, information on transmission efficiency, and the like.

In accordance with at least one embodiment, at least one MCS index value may be defined and included in downlink control information in order to support 256QAM in which a modulation order is 8. The UE may receive DCI selected in an MCS index table including an MCS index value corresponding to 256QAM.

The MCS index tables may be formed according to the first to eleventh embodiments as described above. With reference to FIG. 39, a method for forming an MCS index table according to the eleventh embodiment will be described, hereinafter.

An MCS index table according to at least one embodiment may include five MCS index values corresponding to a QPSK modulation method, six MCS index values corresponding to a 16QAM modulation method, nine MCS index values corresponding to a 64QAM modulation method, and eight MCS index values corresponding to a 256QAM modulation method. Specifically, a total of 28 MCS index values may be assigned for HARQ initial transmission, and the number of MCS index values according to each modulation order may be assigned as described above.

An MCS index table according to another embodiment may include four MCS index values for HARQ retransmission and 28 MCS index values for HARQ initial transmission. For example, as described in the first to eleventh embodiments, one MCS index value may be assigned to each of modulation orders 2, 4, 6 and 8, for HARQ retransmission. Further, 28 MCS index values may be assigned for HARQ initial transmission.

Furthermore, one of MCS index values corresponding to the 256QAM modulation method may be configured to have transmission efficiency identical to maximum transmission efficiency of an MCS index table where a maximum modulation order is set to 6. Fox example, the MCS index table of FIG. 4 has the maximum modulation order as 6. In such an MCS index table of FIG. 4, the maximum transmission efficiency is set to 5.5547. Accordingly, one of the MCS index values for the 256QAM modulation method may be configured to have transmission efficiency of 5.5547. That is, an MCS index 21 is configured to have transmission efficiency equal to 5.5547 as shown in FIG. 38.

In accordance with at least one embodiment, one of MCS index values corresponding to the 256QAM modulation method may be configured to have the value of a coding rate identical to a coding rate having maximum transmission efficiency in an MCS index table where a maximum modulation order is set to 6. For example, in an MCS index table of FIG. 4 having a maximum modulation order of 6, a coding rate R having the maximum transmission efficiency is set to 948. Accordingly, one of the MCS index values for the 256QAM modulation method may be configured to have a coding rate equal to 948. That is, an MCS index 27 may be configured to have a coding rate equal to 948 as illustrated in FIG. 37.

In addition, an MCS index table according to at least one embodiment may be formed to include MCS indices for the 256QAM modulation method, and each one of the MCS indices for the 256QAM modulation method may be configured to have a coding rate illustrated in FIG. 37. For example, a coding rate of an MCS index 21 may be set to 711, a coding rate of an MCS index 22 may be set to 754, a coding rate of an MCS index 23 may be set to 797, a coding rate of an MCS index 24 may be set to 841, a coding rate of an MCS index 25 may be set to 885, a coding rate of an MCS index 26 may be set to 916.5, and a coding rate of an MCS index 27 may be set to 948, as illustrated FIG. 37, In accordance with at least one embodiment, an MCS index table may be formed to have MCS indices for a 256QAM and the MCS indices for the 256QAM may be configured to transmission efficiency of FIG. 38. That is, in the MCS index table, transmission efficiency of an MCS index 21 may be set to 5.5547, transmission efficiency of an MCS index 22 may be set to 5.8906, transmission efficiency of an MCS index 23 may be set to 6.2266, transmission efficiency of an MCS index 24 may be set to 6.5703, transmission efficiency of MCS index 25 may be set to 6.9141, transmission efficiency of MCS index 26 may be set to 7.1602, and transmission efficiency of MCS index 27 may be set to 7.4063, as shown in FIG. 38.

As described, MCS indices 21 to 31 of an MCS index table according to at least one embodiment may be configured as illustrated in FIG. 38.

In step S3920, the UE may identify the modulation information on the DL data on the basis of the selected MCS index value. For example, the UE may identify information on a modulation method on the basis of an MCS index value included in the received DCI. Accordingly, the UE may perform demodulation based on a modulation order indicated by an MCS index value included in the DCI.

Figure 40:
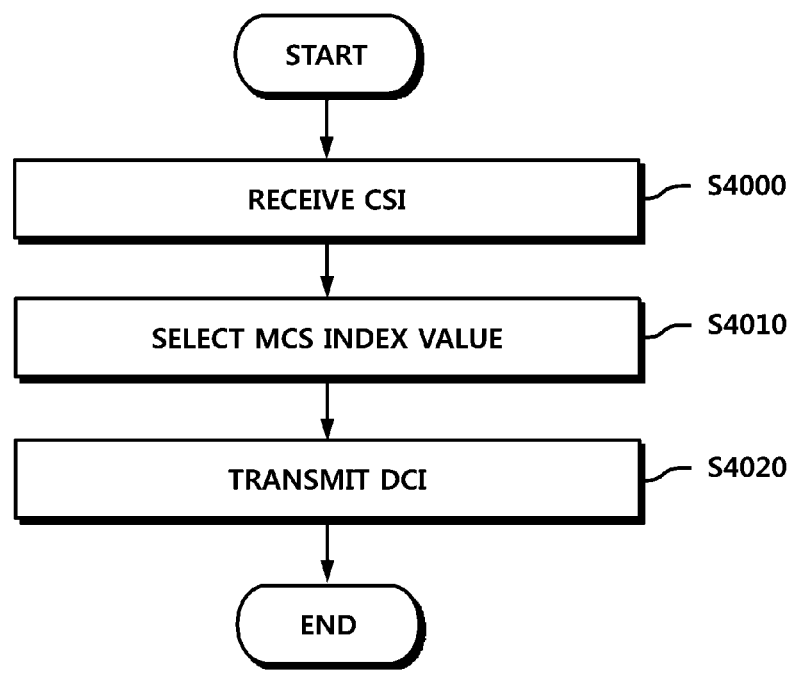
FIG. 40 is a flowchart illustrating an operation of a BS according to another embodiment of the present disclosure.

FIG. 40 is a flowchart illustrating an operation of a BS in accordance with at least one embodiment of the present disclosure.

Referring to FIG. 40, the BS may perform a method for transmitting DCI. Such a method may include: receiving, from the UE, CSI including information obtained by measuring a channel quality state; selecting an MCS index value on the basis of the CSI in a predetermined MCS index table including at least one MCS index value for a 256QAM modulation method; and transmitting the DCI including the selected MCS index value.

Referring to FIG. 40, in step S4000, the BS may receive, from the UE, CSI including information obtained by measuring a channel quality state. The CSI may include information on a result of measuring, by the UE, a channel quality of a DL channel on the basis of a reference signal, and may include CQI index information.

In step S4010, the BS selects an MCS index value based on the CSI in a predetermined MCS index table including at least one MCS index value for the 256QAM modulation method. For example, the BS may select an MCS index value appropriate for a channel state by using the CQI index information included in the received CSI and the predetermined MCS index table.

In accordance with at least one embodiment, at least one MCS index value may be configured for 256QAM where a modulation order is equal to 8. The BS may select an MCS index from an MCS index table including an MCS index value corresponding to 256QAM.

The MCS index table may be formed according to the first to eleventh embodiments. A method for forming an MCS index table according to the eleventh embodiment will be described with reference to FIG. 40.

An MCS index table according to at least one embodiment may include five MCS index values corresponding to a QPSK modulation method, six MCS index values corresponding to a 16QAM modulation method, nine MCS index values corresponding to a 64QAM modulation method, and eight MCS index values corresponding to a 256QAM modulation method. Specifically, a total of 28 MCS index values may be assigned for HARQ initial transmission, and the number of MCS index values according to each modulation order may be assigned as described above.

An MCS index table according to another embodiment may include four MCS index values for HARQ retransmission and 28 MCS index values for HARQ initial transmission. For example, as described in the first to eleventh embodiments, one MCS index value may be assigned to each of modulation orders 2, 4, 6 and 8, for HARQ retransmission. Further, 28 MCS index values may be assigned for HARQ initial transmission.

Furthermore, one of MCS index values corresponding to the 256QAM modulation method may be configured to have transmission efficiency identical to maximum transmission efficiency of an MCS index table where a maximum modulation order is set to 6. Fox example, the MCS index table of FIG. 4 has the maximum modulation order as 6. In such an MCS index table of FIG. 4, the maximum transmission efficiency is set to 5.5547. Accordingly, one of the MCS index values for the 256QAM modulation method may be configured to have transmission efficiency of 5.5547. That is, an MCS index 21 is configured to have transmission efficiency equal to 5.5547 as shown in FIG. 38.

In accordance with at least one embodiment, one of MCS index values corresponding to the 256QAM modulation method may be configured to have the value of a coding rate identical to a coding rate having maximum transmission efficiency in an MCS index table where a maximum modulation order is set to 6. For example, in an MCS index table of FIG. 4 having a maximum modulation order of 6, a coding rate R having the maximum transmission efficiency is set to 948. Accordingly, one of the MCS index values for the 256QAM modulation method may be configured to have a coding rate equal to 948. That is, an MCS index 27 may be configured to have a coding rate equal to 948 as illustrated in FIG. 37.

In addition, an MCS index table according to at least one embodiment may be formed to include MCS indices for the 256QAM modulation method, and each one of the MCS indices for the 256QAM modulation method may be configured to have a coding rate illustrated in FIG. 37. For example, a coding rate of an MCS index 21 may be set to 711, a coding rate of an MCS index 22 may be set to 754, a coding rate of an MCS index 23 may be set to 797, a coding rate of an MCS index 24 may be set to 841, a coding rate of an MCS index 25 may be set to 885, a coding rate of an MCS index 26 may be set to 916.5, and a coding rate of an MCS index 27 may be set to 948, as illustrated FIG. 37.

In accordance with at least one embodiment, an MCS index table may be formed to have MCS indices for a 256QAM and the MCS indices for the 256QAM may be configured to transmission efficiency of FIG. 38. That is, in the MCS index table, transmission efficiency of an MCS index 21 may be set to 5.5547, transmission efficiency of an MCS index 22 may be set to 5.8906, transmission efficiency of an MCS index 23 may be set to 6.2266, transmission efficiency of an MCS index 24 may be set to 6.5703, transmission efficiency of MCS index 25 may be set to 6.9141, transmission efficiency of MCS index 26 may be set to 7.1602, and transmission efficiency of MCS index 27 may be set to 7.4063, as shown in FIG. 38.

As described, MCS indices 21 to 31 of an MCS index table according to at least one embodiment may be configured as illustrated in FIG. 38.

In step S4020, the BS may transmit, to the UE, the DCI including the selected MCS index value. The MCS index table formed as described above may be identically stored in the UE and the BS. By using the stored MCS index table, the UE and the BS may share information on modulation methods through MCS index information of 5 bits.

Hereinafter, configuration of the UE and the BS in accordance with at least one embodiment will be described with reference to FIG. 41 and FIG. 42.

Figure 41:
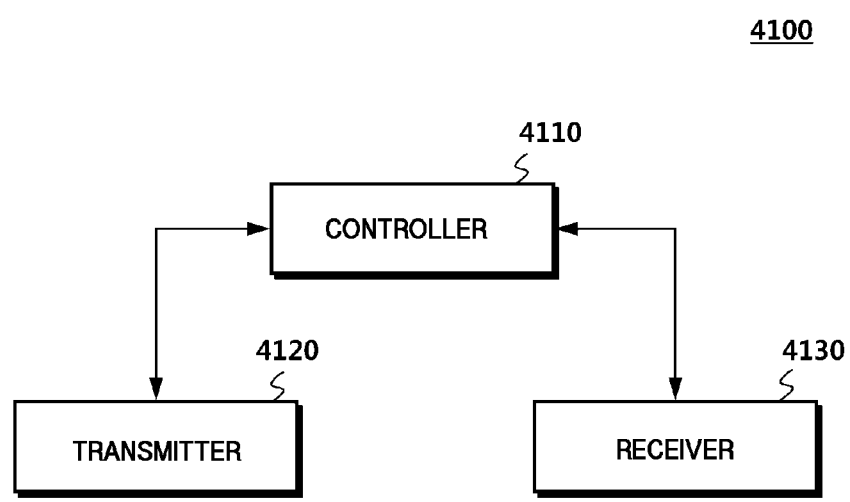
FIG. 41 is a block diagram illustrating a configuration of a UE according to another embodiment of the present disclosure.

FIG. 41 is a block diagram illustrating a UE according to at least one embodiment of the present disclosure.

Referring to FIG. 41, the UE 4100 for receiving DCI may include a transmitter 4120, a receiver 4130, and a controller 4110. The transmitter 4120 transmits, to the BS, CSI including information obtained by measuring a channel quality state. The receiver 4130 receives, from the BS, the DCI including an MCS index value selected based on the CSI in a predetermined MCS index table including an MCS index value corresponding to a 256QAM modulation method. The controller 4110 identifies modulation information on DL data on the basis of the selected MCS index value.

The transmitter 4120 transmits the CSI including the result of measuring the quality of the DL channel. The result of measuring the channel quality may be included as a CQI index value of the CSI. In addition, the transmitter 4120 transmits uplink control information, uplink data and a message to the BS through the relevant channel.

The receiver 4130 receives, from the BS, the DCI including an MCS index value. The DCI received by the receiver 4130 includes the modulation information on the DL data. The DCI includes MCS index information. In particular, the DCI includes pieces of information, such as a modulation order, which is necessary to demodulate DL data, and the like. The MCS index value included in the DCI is a value included in the MCS index table including at least one index value for 256QAM configured according to the first to eleventh embodiments. The MCS index table may be formed according to the above-described embodiments, and may be stored in the UE and the BS. In addition, the receiver 4130 receives the DCI, DL data and a message from the BS through the relevant channel.

The controller 4110 may identify the modulation formation on the DL data on the basis of the selected MCS index value. Specifically, the controller 4110 may identify the modulation method on the DL data on the basis of the MCS index value included in the DCI, and may demodulate the DL data by using the identified modulation formation. Also, the controller 4110 controls the overall operation of the UE according to at least one embodiment of the present disclosure.

Figure 42:
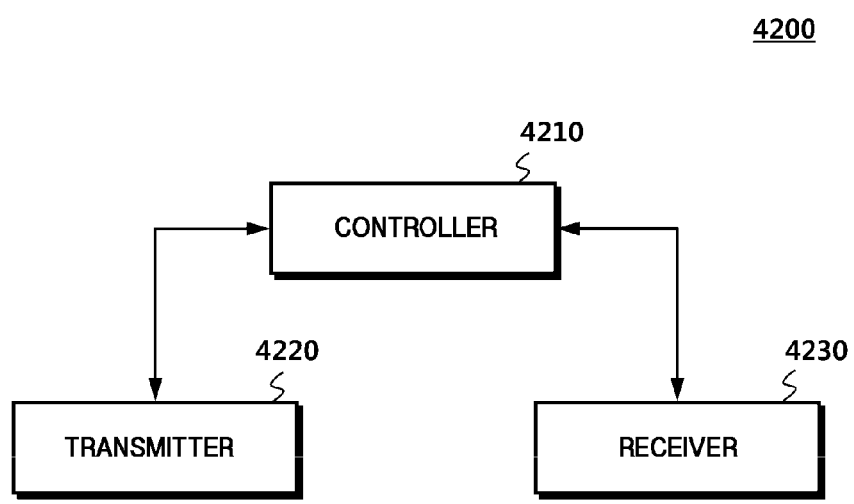
FIG. 42 is a block diagram illustrating a configuration of a BS according to another embodiment of the present disclosure.

FIG. 42 is a block diagram illustrating a configuration of a BS according to at least one embodiment of the present disclosure.

Referring to FIG. 42, the BS 4200 for transmitting DCI includes a receiver 4230, a controller 4210, and a transmitter 4220. The receiver 4230 receives, from the UE, CSI including information obtained by measuring a channel quality state. The controller 4210 selects an MCS index value on the basis of the CSI in a predetermined MCS index table including an MCS index value corresponding to a 256QAM modulation method. The transmitter 4220 transmits the DCI including the selected MCS index value.

The receiver 4230 may receive, from the UE, the CSI including the information obtained by measuring the channel quality state. The CSI may include CQI index information, and the BS may acquire quality information on a DL channel of the UE according to the CQI index information. Also, the receiver 4230 may receive a signal, a message, and/or data, which is necessary to perform embodiments of the present disclosure, from the UE.

The controller 4210 selects an MCS index value to be transmitted to the UE on the basis of the CQI index information of the received CSI and the predetermined MCS index table including the MCS index value corresponding to the 256QAM modulation method. Also, the controller 4210 may modulate DL data to be transmitted to the relevant UE according to the selected MCS index value. The MCS index table may be formed according to at least one embodiment, and may be stored in the UE and the BS. In addition, the controller 4210 controls the overall operation of the BS which is necessary to perform the above-described embodiments of the present disclosure.

The transmitter 4220 transmits, to the UE, the DCI including the selected MCS index value. Also, the transmitter 4220 may further transmit the modulated DL data according to the relevant MCS index information included in the DCI. In addition, the transmitter 4220 may transmit a signal, a message, and/or data, which is necessary to perform embodiments of the present disclosure, to the UE.

The UE and the BS may perform all of the operations described with reference to FIG. 1 to FIG. 40, and each of the UE and the BS may include all of the configurations necessary to perform the relevant operation.

Although the embodiments of the present disclosure have been described for illustrative purposes, those skilled in the art will appreciate that various modifications, additions and substitutions are possible, without departing from the scope and spirit of the disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A method for receiving downlink control information by a user equipment, the method comprising:
   transmitting, to a base station, channel state information including information obtained by measuring a channel quality state;
   receiving, from the base station, the downlink control information including a Modulation and Coding Scheme (MCS) index value selected based on the channel state information in a predetermined MCS index table including at least one MCS index value corresponding to a 256-state Quadrature Amplitude Modulation (256QAM) modulation method;
   identifying modulation information on downlink data on the basis of the selected MCS index value; and
   demodulating the downlink data received from the base station, using the identified modulation information,
   wherein the predetermined MCS index table comprises:
   four MCS index values for Hybrid Automatic Repeat reQuest (HARQ) retransmission; and
   28 MCS index values for HARQ initial transmission.

2. The method of claim 1, wherein the predetermined MCS index table comprises:
   five MCS index values corresponding to a Quadrature Phase Shift Keying (QPSK) modulation method;
   six MCS index values corresponding to a 16QAM modulation method;
   nine MCS index values corresponding to a 64QAM modulation method; and
   eight MCS index values corresponding to the 256QAM modulation method.

3. The method of claim 1, wherein one of the MCS index values corresponding to the 256QAM modulation method is configured to have transmission efficiency identical to maximum transmission efficiency in an MCS index table where a maximum modulation order is set to 6.

4. The method of claim 1, wherein one of the MCS index values corresponding to the 256QAM modulation method is configured to have a value of a coding rate identical to a coding rate having maximum transmission efficiency in an MCS index table where a maximum modulation order is set to 6.

5. The method of claim 1, wherein the predetermined MCS index table is formed to have the MCS index values corresponding to the 256QAM modulation method and each of the MCS index values for the 256QAM modulation method is associated with a coding rate defined in a table below:

| MCS index value | Coding rate (R = code rate * 1024) | Modulation method |
|---|---|---|
| 21 | 711 | 256QAM |
| 22 | 754 | 256QAM |
| 23 | 797 | 256QAM |
| 24 | 841 | 256QAM |
| 25 | 885 | 256QaM |
| 26 | 916.5 | 256QAM |
| 27 | 948 | 256QAM. |

6. The method of claim 1, wherein the predetermined MCS index table is formed to have the MCS index values corresponding to the 256QAM modulation method, and each of the MCS index values for the 256QAM is associated with transmission efficiency defined in a table below:

| MCS index value | Transmission efficiency | Modulation method |
|---|---|---|
| 21 | 5.5547 | 256QAM |
| 22 | 5.8906 | 256QAM |
| 23 | 6.2266 | 256QAM |
| 24 | 6.5703 | 256QaM |
| 25 | 6.9141 | 256QAM |
| 26 | 7.1602 | 256QAM |
| 27 | 7.4063 | 256QAM. |

7. A method for transmitting downlink control information by a base station, the method comprising:
   receiving, from a user equipment, channel state information including information obtained by measuring a channel quality state;
   selecting a Modulation and Coding Scheme (MCS) index value on the basis of the channel state information in a predetermined MCS index table including at least one MCS index value corresponding to a 256-state Quadrature Amplitude Modulation (256QAM) modulation method;
   creating the downlink control information including the selected MCS index value; and
   transmitting the downlink control information to the user equipment such that the user equipment demodulates downlink data using modulation information identified from the downlink control information,
   wherein the predetermined MCS index table comprises:
   four MCS index values for Hybrid Automatic Repeat reQuest (HARQ) retransmission; and
   28 MCS index values for HARQ initial transmission.

8. The method of claim 7, wherein the MCS index table comprises:
   five MCS index values corresponding to a Quadrature Phase Shift Keying (QPSK) modulation method;

six MCS index values corresponding to a 16QAM modulation method;
nine MCS index values corresponding to a 64QAM modulation method; and
eight MCS index values corresponding to the 256QAM modulation method.

9. The method of claim 7, wherein one of the MCS index values corresponding to the 256QAM modulation method is configured to have transmission efficiency identical to maximum transmission efficiency in an MCS index table where a maximum modulation order is set to 6.

10. The method of claim 7, wherein one of the MCS index values corresponding to the 256QAM modulation method is configured to have a value of a coding rate identical to a coding rate having maximum transmission efficiency in an MCS index table where a maximum modulation order is set to 6.

11. The method of claim 7, wherein the predetermined MCS index table is formed to have the MCS index values corresponding to the 256QAM modulation method and each of the MCS index values is associated with a coding rate defined in a table below:

| MCS index value | Coding rate (R = code rate*1024) | Modulation method |
|---|---|---|
| 21 | 711 | 256QAM |
| 22 | 754 | 256QAM |
| 23 | 797 | 256QAM |
| 24 | 841 | 256QAM |
| 25 | 885 | 256QaM |
| 26 | 916.5 | 256QAM |
| 27 | 948 | 256QAM. |

12. The method of claim 7, wherein the predetermined MCS index table is formed to have the MCS index values corresponding to the 256QAM modulation method, and each of the MCS index values for the 256QAM modulation method is associated with transmission efficiency defined in a table below:

| MCS index value | Transmission efficiency | Modulation method |
|---|---|---|
| 21 | 5.5547 | 256QAM |
| 22 | 5.8906 | 256QAM |
| 23 | 6.2266 | 256QAM |
| 24 | 6.5703 | 256QaM |
| 25 | 6.9141 | 256QAM |
| 26 | 7.1602 | 256QAM |
| 27 | 7.4063 | 256QAM. |

13. A user equipment for receiving downlink control information, the user equipment comprising:
a transmitter configured to transmit, to a base station, channel state information including information obtained by measuring a channel quality state;
a receiver configured to receive, from the base station, a downlink control information including a Modulation and Coding Scheme (MCS) index value selected based on the channel state information in a predetermined MCS index table including at least one MCS index value corresponding to a 256-state Quadrature Amplitude Modulation (256QAM) modulation method; and
a controller configured (i) to identify modulation information on downlink data based on the selected MCS index value and (ii) to demodulate the downlink data received from the base station, using the identified modulation information,
wherein the predetermined MCS index table comprises:
four MCS index values for Hybrid Automatic Repeat reQuest (HARQ) retransmission; and
28 MCS index values for HARQ initial transmission.

14. The user equipment of claim 13, wherein the MCS index table comprises:
five MCS index values corresponding to a Quadrature Phase Shift Keying (QPSK) modulation method;
six MCS index values corresponding to a 16QAM modulation method;
nine MCS index values corresponding to a 64QAM modulation method; and
eight MCS index values corresponding to the 256QAM modulation method.

15. The user equipment of claim 13, wherein one of the MCS index values corresponding to the 256QAM modulation method is configured to have transmission efficiency identical to maximum transmission efficiency in an MCS index table where a maximum modulation order is set to 6.

16. The user equipment of claim 15, wherein one of the MCS index values corresponding to the 256QAM modulation method is configured to have a value of a coding rate identical to a coding rate having maximum transmission efficiency in an MCS index table where a maximum modulation order is set to 6.

17. The user equipment of claim 13, wherein the predetermined MCS index table is formed to have the MCS index values corresponding to the 256QAM modulation method, and each of the MCS index values for the 256QAM modulation method is associated with a coding rate defined in a table below:

| MCS index value | Coding rate (R = code rate * 1024) | Modulation method |
|---|---|---|
| 21 | 711 | 256QAM |
| 22 | 754 | 256QAM |
| 23 | 797 | 256QAM |
| 24 | 841 | 256QAM |
| 25 | 885 | 256QaM |
| 26 | 916.5 | 256QAM |
| 27 | 948 | 256QAM. |

18. The user equipment of claim 13, wherein the predetermined MCS index table is formed to have the MCS index values corresponding to the 256QAM modulation method, and each of the MCS index values for the 256QAM modulation method is associated with transmission efficiency defined in a table below:

| MCS index value | Transmission efficiency | Modulation method |
|---|---|---|
| 21 | 5.5547 | 256QAM |
| 22 | 5.8906 | 256QAM |
| 23 | 6.2266 | 256QAM |
| 24 | 6.5703 | 256QaM |
| 25 | 6.9141 | 256QAM |
| 26 | 7.1602 | 256QAM |
| 27 | 7.4063 | 256QAM. |

* * * * *

UNITED STATES PATENT AND TRADEMARK OFFICE
CERTIFICATE OF CORRECTION

Page 1 of 1

PATENT NO. : 9,461,771 B2
APPLICATION NO. : 14/664854
DATED : October 4, 2016
INVENTOR(S) : Seung Hyun Kang et al.

It is certified that error appears in the above-identified patent and that said Letters Patent is hereby corrected as shown below:

In the Claims

In Claim 16, Column 28, Line 23, "The user equipment of claim 15," should be amended --The user equipment of claim 13--.

Signed and Sealed this
Twenty-first Day of March, 2017

Michelle K. Lee
*Director of the United States Patent and Trademark Office*